(12) United States Patent
Besore et al.

(10) Patent No.: US 8,367,984 B2
(45) Date of Patent: Feb. 5, 2013

(54) ENERGY MANAGEMENT OF HOUSEHOLD APPLIANCES

(75) Inventors: John K. Besore, Prospect, KY (US); Jeff Donald Drake, Louisville, KY (US); Michael F. Finch, Louisville, KY (US); Darin Franks, Lanesville, IN (US); John Joseph Roetker, Louisville, KY (US); Steven Keith Root, Buckner, KY (US); Natarajan Venkatakrishnan, Louisville, KY (US); Eric K. Watson, Crestwood, KY (US)

(73) Assignee: General Electric Company, Schenectady, NY (US)

( * ) Notice: Subject to any disclaimer, the term of this patent is extended or adjusted under 35 U.S.C. 154(b) by 644 days.

(21) Appl. No.: 12/559,654

(22) Filed: Sep. 15, 2009

(65) Prior Publication Data

US 2010/0187219 A1    Jul. 29, 2010

Related U.S. Application Data

(60) Provisional application No. 61/097,082, filed on Sep. 15, 2008.

(51) Int. Cl.
*H05B 1/02* (2006.01)
(52) U.S. Cl. ......... 219/490; 219/492; 219/494; 219/510
(58) Field of Classification Search ................. 219/490, 219/491, 492, 493, 494, 495, 496, 510
See application file for complete search history.

(56) References Cited

U.S. PATENT DOCUMENTS

| | | | |
|---|---|---|---|
| 3,683,343 A | 8/1972 | Feldman et al. | |
| 4,048,812 A | 9/1977 | Thomason | |
| 4,190,756 A | 2/1980 | Foerstner | |
| 4,247,786 A | 1/1981 | Hedges | |
| 4,362,970 A | 12/1982 | Grady | |
| 4,454,509 A | 6/1984 | Buennagel et al. | |
| 4,659,943 A | 4/1987 | Virant | |
| 4,718,403 A | 1/1988 | McCall | |
| 4,998,024 A | 3/1991 | Kirk et al. | |

(Continued)

FOREIGN PATENT DOCUMENTS

| | | |
|---|---|---|
| WO | 86/00976 A1 | 2/1986 |
| WO | 90/12261 A1 | 10/1990 |

(Continued)

OTHER PUBLICATIONS

PCT Application No. PCT/US09/56911, Search Report, Mar. 10, 2010.

(Continued)

*Primary Examiner* — Trong Phan
(74) *Attorney, Agent, or Firm* — Global Patent Operation

(57) ABSTRACT

A water heater comprises a body defining a chamber for holding water to be heated, an inlet opening and an outlet opening in communication with the chamber for flowing water therethrough and one or more power consuming features/functions including a heater for heating the water within the chamber. A controller is operatively connected to the one or more power consuming features/functions. The controller is configured to receive and process a signal indicative of a utility state. The controller operates the water heater in one of a plurality of operating modes, including at least a normal operating mode and an energy savings mode, in response to the received signal. The controller is configured to at least one of selectively adjust and deactivate at least one of the one or more power consuming features/functions to reduce power consumption of the water heater in the energy savings mode.

25 Claims, 23 Drawing Sheets

U.S. PATENT DOCUMENTS

| | | | |
|---|---|---|---|
| 5,040,724 A | | 8/1991 | Brinkruff et al. |
| 5,137,041 A | | 8/1992 | Hall |
| 5,183,998 A | * | 2/1993 | Hoffman et al. ............... 219/492 |
| 5,220,807 A | * | 6/1993 | Bourne et al. ................ 219/492 |
| 5,408,578 A | * | 4/1995 | Bolivar ........................ 392/490 |
| 5,430,430 A | | 7/1995 | Gilbert |
| 5,451,843 A | | 9/1995 | Kahn et al. |
| 5,479,157 A | | 12/1995 | Suman et al. |
| 5,479,558 A | * | 12/1995 | White et al. ................. 219/497 |
| 5,481,140 A | | 1/1996 | Maruyama et al. |
| 5,495,551 A | * | 2/1996 | Robinson et al. ............. 219/510 |
| 5,504,306 A | * | 4/1996 | Russell et al. ................ 219/497 |
| 5,515,692 A | | 5/1996 | Sterber et al. |
| 5,574,979 A | | 11/1996 | West |
| 5,581,132 A | | 12/1996 | Chadwick |
| 5,635,895 A | | 6/1997 | Murr |
| 5,706,191 A | | 1/1998 | Bassett et al. |
| 5,866,880 A | * | 2/1999 | Seitz et al. ................... 219/492 |
| 5,874,902 A | | 2/1999 | Heinrich et al. |
| 5,883,802 A | | 3/1999 | Harris |
| 5,886,647 A | | 3/1999 | Badger et al. |
| 5,926,776 A | | 7/1999 | Glorioso et al. |
| 5,956,462 A | | 9/1999 | Langford |
| 6,018,150 A | * | 1/2000 | Maher, Jr. .................... 219/497 |
| 6,080,971 A | * | 6/2000 | Seitz et al. ................... 219/492 |
| 6,118,099 A | * | 9/2000 | Lake et al. .................... 219/494 |
| 6,179,213 B1 | | 1/2001 | Gibino et al. |
| 6,229,433 B1 | | 5/2001 | Rye et al. |
| 6,246,831 B1 | * | 6/2001 | Seitz et al. ................... 219/497 |
| 6,380,866 B1 | | 4/2002 | Sizer et al. |
| 6,400,103 B1 | | 6/2002 | Adamson |
| 6,480,753 B1 | | 11/2002 | Calder et al. |
| 6,553,595 B1 | | 4/2003 | Bruntz et al. |
| 6,631,622 B1 | | 10/2003 | Ghent et al. |
| 6,694,753 B1 | | 2/2004 | Lanz et al. |
| 6,694,927 B1 | * | 2/2004 | Pouchak et al. ............... 219/483 |
| 6,704,401 B2 | | 3/2004 | Piepho et al. |
| 6,778,868 B2 | | 8/2004 | Imamura et al. |
| 6,806,446 B1 | * | 10/2004 | Neale ............................ 219/497 |
| 6,817,195 B2 | | 11/2004 | Rafalovich et al. |
| 6,828,695 B1 | | 12/2004 | Hansen |
| 6,873,876 B1 | | 3/2005 | Aisa |
| 6,904,385 B1 | | 6/2005 | Budike |
| 6,922,598 B2 | | 7/2005 | Lim et al. |
| 6,943,321 B2 | | 9/2005 | Carbone et al. |
| 6,983,210 B2 | | 1/2006 | Matsubayashi et al. |
| 7,039,575 B2 | | 5/2006 | Juneau |
| 7,043,380 B2 | | 5/2006 | Rodenberg et al. |
| 7,053,790 B2 | | 5/2006 | Jang et al. |
| 7,057,140 B2 | * | 6/2006 | Pittman ......................... 219/497 |
| 7,069,090 B2 | | 6/2006 | Huffington et al. |
| 7,110,832 B2 | | 9/2006 | Ghent |
| 7,155,305 B2 | | 12/2006 | Hayes et al. |
| 7,164,851 B2 | * | 1/2007 | Sturm et al. .................. 219/497 |
| 7,206,670 B2 | | 4/2007 | Pimputkar et al. |
| 7,266,962 B2 | | 9/2007 | Montuoro et al. |
| 7,274,973 B2 | | 9/2007 | Nichols et al. |
| 7,274,975 B2 | | 9/2007 | Miller et al. |
| 7,372,002 B2 | * | 5/2008 | Nakamura et al. ............ 219/494 |
| 7,420,293 B2 | | 9/2008 | Donnelly et al. |
| 7,446,646 B2 | | 11/2008 | Huomo |
| 7,478,070 B2 | | 1/2009 | Fukui et al. |
| 7,561,977 B2 | | 7/2009 | Horst et al. |
| 7,685,849 B2 | | 3/2010 | Worthington |
| 7,720,035 B2 | | 5/2010 | Oh et al. |
| 7,751,339 B2 | | 7/2010 | Melton et al. |
| 7,783,390 B2 | | 8/2010 | Miller |
| 7,919,729 B2 | * | 4/2011 | Hsu .............................. 219/492 |
| 7,925,388 B2 | | 4/2011 | Ying |
| 7,991,513 B2 | | 8/2011 | Pitt |
| 8,024,073 B2 | | 9/2011 | Imes et al. |
| 8,027,752 B2 | | 9/2011 | Castaldo et al. |
| 8,033,686 B2 | | 10/2011 | Recker et al. |
| 8,094,037 B2 | | 1/2012 | Unger |
| 8,185,252 B2 | | 5/2012 | Besore |
| 2001/0048361 A1 | | 12/2001 | Mays et al. |
| 2002/0024332 A1 | | 2/2002 | Gardner |
| 2002/0125246 A1 | | 9/2002 | Cho et al. |
| 2002/0175806 A1 | | 11/2002 | Marneweck et al. |
| 2002/0196124 A1 | | 12/2002 | Howard et al. |
| 2002/0198629 A1 | | 12/2002 | Ellis |
| 2003/0043845 A1 | | 3/2003 | Lim et al. |
| 2003/0178894 A1 | | 9/2003 | Ghent |
| 2003/0193405 A1 | | 10/2003 | Hunt et al. |
| 2003/0194979 A1 | | 10/2003 | Richards et al. |
| 2003/0233201 A1 | | 12/2003 | Horst et al. |
| 2004/0024483 A1 | | 2/2004 | Holcombe |
| 2004/0034484 A1 | | 2/2004 | Solomita et al. |
| 2004/0098171 A1 | | 5/2004 | Horst |
| 2004/0100199 A1 | | 5/2004 | Yang |
| 2004/0107510 A1 | | 6/2004 | Buckroyd et al. |
| 2004/0112070 A1 | | 6/2004 | Schanin |
| 2004/0117330 A1 | | 6/2004 | Ehlers et al. |
| 2004/0118008 A1 | | 6/2004 | Jeong et al. |
| 2004/0133314 A1 | | 7/2004 | Ehlers et al. |
| 2004/0139038 A1 | | 7/2004 | Ehlers et al. |
| 2004/0254654 A1 | | 12/2004 | Donnelly et al. |
| 2005/0011205 A1 | | 1/2005 | Holmes et al. |
| 2005/0134469 A1 | | 6/2005 | Odorcic et al. |
| 2005/0138929 A1 | | 6/2005 | Enis et al. |
| 2005/0173401 A1 | | 8/2005 | Bakanowski et al. |
| 2005/0190074 A1 | | 9/2005 | Cumeralto et al. |
| 2006/0031180 A1 | | 2/2006 | Tamarkin et al. |
| 2006/0036338 A1 | | 2/2006 | Harkcom et al. |
| 2006/0068728 A1 | | 3/2006 | Ishidoshiro et al. |
| 2006/0095164 A1 | | 5/2006 | Donnelly et al. |
| 2006/0123807 A1 | | 6/2006 | Sullivan et al. |
| 2006/0159043 A1 | | 7/2006 | Delp et al. |
| 2006/0190139 A1 | | 8/2006 | Reaume et al. |
| 2006/0208570 A1 | | 9/2006 | Christian et al. |
| 2006/0272830 A1 | | 12/2006 | Fima |
| 2006/0276938 A1 | | 12/2006 | Miller |
| 2006/0289436 A1 | | 12/2006 | Carbone et al. |
| 2007/0005195 A1 | | 1/2007 | Pasquale et al. |
| 2007/0030116 A1 | | 2/2007 | Feher |
| 2007/0043478 A1 | | 2/2007 | Ehlers et al. |
| 2007/0151311 A1 | | 7/2007 | McAllister et al. |
| 2007/0185675 A1 | | 8/2007 | Papamichael et al. |
| 2007/0203860 A1 | | 8/2007 | Golden et al. |
| 2007/0213880 A1 | | 9/2007 | Ehlers |
| 2007/0220907 A1 | | 9/2007 | Ehlers |
| 2007/0229236 A1 | | 10/2007 | Mercer et al. |
| 2007/0271006 A1 | | 11/2007 | Golden et al. |
| 2007/0276547 A1 | | 11/2007 | Miller |
| 2008/0029081 A1 | | 2/2008 | Gagas et al. |
| 2008/0034768 A1 | | 2/2008 | Pimentel et al. |
| 2008/0083729 A1 | | 4/2008 | Etheredge et al. |
| 2008/0106147 A1 | | 5/2008 | Caggiano et al. |
| 2008/0120790 A1 | | 5/2008 | Ashrafzadeh et al. |
| 2008/0122585 A1 | | 5/2008 | Castaldo et al. |
| 2008/0136581 A1 | | 6/2008 | Heilman et al. |
| 2008/0144550 A1 | | 6/2008 | Makhlouf et al. |
| 2008/0167756 A1 | | 7/2008 | Golden et al. |
| 2008/0167931 A1 | | 7/2008 | Gerstemeier et al. |
| 2008/0172312 A1 | | 7/2008 | Synesiou et al. |
| 2008/0177678 A1 | | 7/2008 | Di Martini et al. |
| 2008/0204240 A1 | | 8/2008 | Hilgers et al. |
| 2008/0215263 A1 | | 9/2008 | Flohr |
| 2008/0258633 A1 | | 10/2008 | Voysey |
| 2008/0272934 A1 | | 11/2008 | Wang et al. |
| 2009/0006878 A1 | | 1/2009 | Borghetti et al. |
| 2009/0038369 A1 | | 2/2009 | Vondras |
| 2009/0063257 A1 | | 3/2009 | Zak et al. |
| 2009/0105888 A1 | | 4/2009 | Flohr et al. |
| 2009/0146838 A1 | | 6/2009 | Katz |
| 2009/0240381 A1 | | 9/2009 | Lane |
| 2009/0326728 A1 | | 12/2009 | Chrisop et al. |
| 2010/0017242 A1 | | 1/2010 | Hamilton et al. |
| 2010/0070091 A1 | | 3/2010 | Watson et al. |
| 2010/0092625 A1 | | 4/2010 | Finch et al. |
| 2010/0131117 A1 | | 5/2010 | Mattiocco et al. |
| 2010/0175719 A1 | | 7/2010 | Finch et al. |
| 2010/0179708 A1 | | 7/2010 | Watson et al. |
| 2010/0262963 A1 | | 10/2010 | Wassermann et al. |
| 2010/0301774 A1 | | 12/2010 | Chemel et al. |
| 2011/0001438 A1 | | 1/2011 | Chemel et al. |
| 2011/0062142 A1 | | 3/2011 | Steurer |

| | | |
|---|---|---|
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| WO | 98/48335 A1 | 10/1998 |
| WO | 2007/060059 A1 | 5/2007 |

OTHER PUBLICATIONS

International Search Report from PCT Application No. PCT/US2009/056878, Nov. 17, 2009.
International Search Report from PCT Application No. PCT/US2009/056882, Nov. 4, 2009.
International Search Report from PCT Application No. PCT/US2009/056883, Oct. 26, 2009.
International Search Report from PCT Application No. PCT/US2009/056886, Nov. 5, 2009.
International Search Report from PCT Application No. PCT/US2009/056889, Nov. 10, 2009.
International Search Report from PCT Application No. PCT/US2009/056894, Nov. 13, 2009.
International Search Report from PCT Application No. PCT/US2009/056895, Nov. 9, 2009.
International Search Report from PCT Application No. PCT/US2009/056901, Nov. 10, 2009.
International Search Report from PCT Application No. PCT/US2009/056906, Nov. 10, 2009.
International Search Report from PCT Application No. PCT/US2009/056913, Nov. 10, 2009.
International Search Report from PCT Application No. PCT/US2009/056914, Nov. 2, 2009.
International Search Report from PCT Application No. PCT/US2009/056919, Nov. 2, 2009.
Search Report from EP Application No. 10153695.1, May 24, 2012.
Lemay et al., An Integrated Architecture for Demand Response Communications and Control, University of Illinois Urbana-Champaign, Oct. 28, 2008.
Real-Time Feedback, Natural Resources Canada via website www.nrcan.gc.ca , 2008, http://oee.nrcan.gc.ca/publications/equipment/10918.

* cited by examiner

| | | | |
|---|---|---|---|
| REFRIGERATOR | REFR UI RESPONSE (DSM DISABLED) | DURING OPERATION | NORMAL DISPLAY |
| | REFR UI RESPONSE (DSM ENABLED) | DURING OPERATION | DISPLAY "ECO RATE LOW-NORMAL OPERATION" |
| WASHER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | WASHER UI RESPONSE (DSM ENABLED) | PRIOR TO OPERATION | NORMAL DISPLAY |
| | WASHER UI RESPONSE (DSM ENABLED) | DURING OPERATION | NORMAL DISPLAY |
| DRYER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | DRYER UI RESPONSE (DSM ENABLED) | PRIOR TO OPERATION | NORMAL DISPLAY |
| | DRYER UI RESPONSE (DSM ENABLED) | DURING OPERATION | NORMAL DISPLAY |
| RANGE | RANGE UI RESPONSE (DSM DISABLED OR NORMAL) | PRIOR TO OPERATION | NORMAL DISPLAY |
| | | DURING OPERATION | NORMAL DISPLAY |
| | RANGE UI RESPONSE (DSM ENABLED) | PRIOR TO OPERATION | NORMAL DISPLAY |
| | | DURING OPERATION | NORMAL DISPLAY |
| DISHWASHER | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |
| MWO | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |

MATCH TO FIG. 9B

*Fig. 9A*

| MEDIUM | HIGH | CRITICAL |
|---|---|---|
| NORMAL DISPLAY | NORMAL DISPLAY | NORMAL DISPLAY |
| DISPLAY "ECO RATE MEDIUM-NORMAL OPERATION" | DISPLAY "ECO RATE HIGH - FEATURES DELAYED" | DISPLAY "ECO RATE CRITICAL - FEATURES DELAYED" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| DISPLAY "ECO" | DISPLAY "ECO" | DISPLAY "ECO" |
| DISPLAY "ECO" | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |

MATCH TO FIG. 9A

*Fig. 9B*

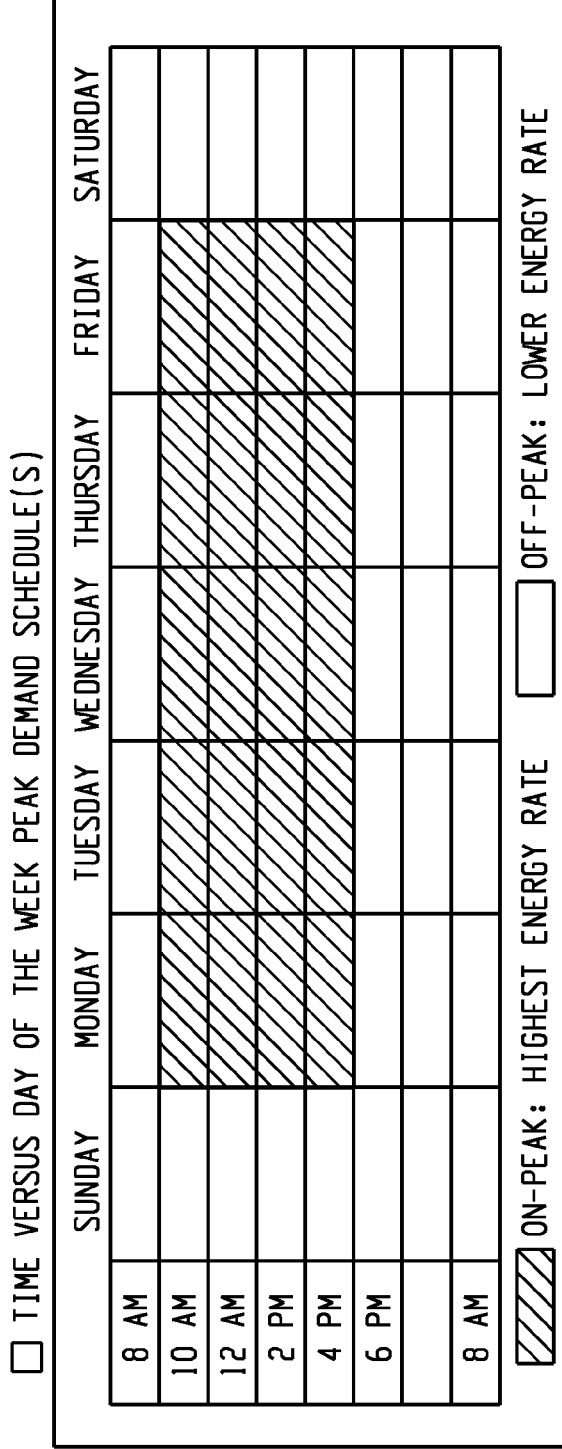

ELECTRIC POWER UTILITY - TIME OF USE - AS APPLIED TO REFRIGERATION

BACKGROUND

TIME-OF-USE IS A VOLUNTARY ELECTRIC UTILITY PROGRAM WHICH ALLOWS A CONSUMER TO PURCHASE LOWER PRICED ELECTRIC POWER BY USING POWER WHEN THE "GRID" ELECTRIC DEMAND IS LESS. THE TIME-OF-USE SCHEDULE IS GENERALLY WORKED OUT WITH THE REGIONAL POWER COMPANY AND LEGISLATORS AND THE SCHEDULE IS WELL KNOWN AND EASILY OBTAINED BY THE CONSUMER.

PARTS OF THE SYSTEM

SYSTEM IMPLEMENTATION HAS THREE UNIQUE CATEGORIES AND ARE LISTED BELOW:

(1) METHOD OF INPUTTING THE TIME-OF-USE SCHEDULE (A) CONSUMER ZIP CODE ENTRY - REQUIRES A DATABASE MANAGED BY GE AND UPGRADEABLE
  (B) TIME VERSUS DAY OF THE WEEK PEAK DEMAND SCHEDULE WITH USER INPUT - REQUIRES INITIAL INPUT BY CONSUMER AND DATABASE MANAGED BY USER WHEN CHANGES HAPPEN (2) ELECTRONIC CIRCUIT CHANGES REQUIRED - CIRCUITRY THAT KEEPS TIME WILL BE REQUIRED AND SOFTWARE TO INTERACT WITH THE TIME-OF-USE SCHEDULE INPUT AND ACTIONS WOULD BE REQUIRED (A) ONE METHOD WOULD BE A ZERO CROSS
  (B) ANOTHER METHOD WOULD BE A CLOCK CALENDAR IC WITH CAPACITOR OR BATTERY BACKUP (3) A LIST OF ACTIONS THAT COULD BE PERFORMED AT TIMES WHEN THE ELECTRIC RATES ARE OFF PEAK (A) DELAY DEFROST UNTIL OFF PEAK
  (B) PRECHILL WHEN NEARING PEAK DEMAND TO KEEP THE COMPRESSOR USAGE AT A MINIMUM DURING PEAK DEMAND
  (C) ALERT USER WHEN PEAK DEMAND IS ON WHEN THE DOORS ARE OPENED (LIGHT ELECTRIC DRAW) OR WHEN THE ICE DISPENSER IS USED DURING PEAK DEMAND

Fig. 11

A LIST OF ACTIONS THAT COULD BE PERFORMED AT TIMES WHEN THE ELECTRIC RATES ARE OFF PEAK

> DELAY DEFROST UNTIL OFF PEAK

> PRECHILL WHEN NEARING PEAK DEMAND TO KEEP THE COMPRESSOR USAGE AT A MINIMUM DURING PEAK DEMAND

> ALERT USER WHEN PEAK DEMAND IS ON - OCCURS WHEN THE DOOR WAS OPENED OR ICE CRUSHER USED, ETC.

*Fig. 20*

TITLE: APPLIANCE ACTIONS AND RESPONSE - DEMAND SIDE MANAGEMENT FOR HOME APPLIANCES
ABSTRACT: THE INVENTION(S) ARE THE APPLIANCE ACTIONS AND RESPONSES TO ELECTRIC UTILITY SIGNALS PROVIDED IN CONJUNCTION WITH A DEMAND SIDE MANAGEMENT (DSM) SYSTEM. THIS IS PART OF THE ADVANCED METERING INFRASTRUCTURE (AMI) INITIATIVE WHICH PROVIDES REMOTE METERING FUNCTIONS SUCH AS REMOTE METER READING, DEMAND SIGNALING/LOAD CONTROL, ETC.. THE ATTACHED DOCUMENT DESCRIBES IN BRIEF DETAIL ACTIONS AND RESPONSES TO DSM SIGNALING.

UPON RECEIVING A HIGH PRICE ENERGY SIGNAL THE USER MAY SET THE UNIT TO:

a) DELAY ALL SPECIAL MODES UNTIL THE LOW PRICED ENERGY SIGNAL IS RECEIVED. MODE EXAMPLES ARE:

i. ICE MAKER ii. BEVERAGE CENTER iii. TURBO COOL iv. CUSTOM COOL v. QUICK ICE b) OVERRIDE THE HIGH PRICED ENERGY SIGNAL, ALWAYS OR BASED ON A CERTAIN $/Kwh LEVEL c) DELAY DEFROST UNTIL PEFORMANCE IS WOULD BE AFFECTED d) ANNOUNCE OR AUDIBLE ALERT OF THE "HIGH PRICED ENERGY SIGNAL" DURING A CYCLE e) VISUALLY ALERT USER OF THE "HIGH PRICED ENERGY" SIGNAL f) DISPLAY THE COST OF RUNNING THE UNIT IN THE SELECTED MODE OF OPERATION g) DISPLAY THE COST OF ENERGY AT THE PRESENT TIME h) DISABLE LIGHTING i) TURN OFF SWEAT HEATERS

Fig. 21

ENERGY MANAGEMENT OF HOUSEHOLD APPLIANCES

CROSS REFERENCE TO RELATED APPLICATIONS

The present application claims priority from U.S. Provisional Patent Application Ser. No. 61/097,082 filed 15 Sep. 2008, now Ser. No. 12/559,703, filed 15 Sep. 2009 which provisional patent application is expressly incorporated herein by reference, in its entirety. In addition, cross-reference is made to commonly owned, applications Ser. No. 12/559,636, filed 15 Sep. 2009 Ser. No. 12/559,528, filed 15 Sep. 2009 Ser. No. 12/559,539, filed 15 Sep. 2009 Ser. No. 12/559,581, filed 15 Sep. 2009 Ser. No. 12/559,550, filed 15 Sep. 2009 Ser. No. 12/559,597, filed 15 Sep. 2009 Ser. No. 12/559,705, filed 15 Sep. 2009 Ser. No. 12/559,561, filed 15 Sep. 2009 Ser. No. 12/559,577, filed 15 Sep. 2009 Ser. No. 12/559,751, filed 15 Sep. 2009 and Ser. No. 12/559,684, filed 15 Sep. 2009.

BACKGROUND

This disclosure relates to energy management, and more particularly to energy management of household consumer appliances. The disclosure finds particular application to changing existing appliances via add-on features or modules, and incorporating new energy saving features and functions into new appliances.

Currently utilities charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened.

One proposed third party solution is to provide a system where a controller "switches" the actual energy supply to the appliance or control unit on and off. However, there is no active control beyond the mere on/off switching. It is believed that others in the industry cease some operations in a refrigerator during on-peak time.

For example, in a refrigerator most energy is consumed to keep average freezer compartment temperature at a constant level. Recommended temperature level is based on bacteria multiplication. Normally recommended freezer temperature for long (1-2 month) food storage is 0 degrees F. Research shows that bacteria rise is a linear function of the compartment temperature, i.e., the lower the temperature the lower the bacteria multiplication. Refrigerator designers now use this knowledge to prechill a freezer compartment (and in less degree a refrigerator compartment also) before defrost, thus keeping an average temperature during time interval that includes before, during, and after defrost at approximately the same level (for example, 0 degrees F.).

There are also currently different methods used to determine when variable electricity-pricing schemes go into effect. There are phone lines, schedules, and wireless signals sent by the electrical company. One difficulty is that no peak shaving method for an appliance such as a refrigerator will provide a maximal benefit. Further, different electrical companies use different methods of communicating periods of high electrical demand to their consumers. Other electrical companies simply have rate schedules for different times of day.

Electrical utilities moving to an Advanced Metering Infrastructure (AMI) system will need to communicate to appliances. Heating Ventilation and Air Conditioning units (HVAC units), water heaters, etc. in a home or office building. All electrical utility companies (more than 3,000 in the US) will not be using the same communication method to signal in the AMI system. Similarly, known systems do not communicate directly with the appliance using a variety of communication methods and protocols, nor is a modular and standard method created for communication devices to interface and to communicate operational modes to the main controller of the appliance. Although conventional WiFi/ZigBee/PLC communication solutions are becoming commonplace, this disclosure introduces numerous additional lower cost, reliable solutions to trigger "load shedding" responses in appliances or other users of power. This system may also utilize the commonplace solutions as parts of the communication protocols.

BRIEF DESCRIPTION OF THE DISCLOSURE

According to one aspect, a water heater comprises a body defining a chamber for holding water to be heated, an inlet opening and an outlet opening in communication with the chamber for flowing water therethrough and one or more power consuming features/functions including a heater for heating the water within the chamber. A controller is operatively connected to the one or more power consuming features/functions. The controller is configured to receive and process a signal indicative of a utility state. The controller operates the water heater in one of a plurality of operating modes, including at least, a normal operating mode and an energy savings mode, in response to the received signal. The controller is configured to at least one of selectively adjust and deactivate at least one of the one or more power consuming features/functions to reduce power consumption of the water heater in the energy savings mode.

According to another aspect, a water heater control method is provided. A state for an associated energy supplying utility is determined. The utility state is indicative of at least a peak demand period or an off-peak demand period. The water heater is operated in a normal mode during the off-peak demand period. The water heater is operated in an energy savings mode during the peak demand period. Any number of one or more power consuming features/functions of the water heater is selectively adjusted and/or deactivated to reduce power consumption of the water heater in the energy savings mode, including increasing a setpoint temperature of a freezer compartment to precipitate less heater on time in the energy savings mode. The normal mode is returned to after the peak demand period is over.

According to yet another aspect, a water heater comprises a body defining a chamber for holding water to be heated. An inlet opening and an outlet opening are in communication with the chamber for flowing water therethrough. A first heater and a second heater heat the water in the chamber. The first heater includes one of an electrically driven heating element and a burner. The second heater includes a heat pump. A controller is configured to receive and process an energy signal. The signal has a first state indicative of a utility peak demand period and a second state indicative of a utility off-peak demand period. The controller operates the water heater in one of an energy savings mode and a normal operating mode based on the received signal being in the first and second states respectively. The controller is configured to increase the setpoint temperature of the water heater and deactivate the first heater in the energy savings mode unless performance degradation of the water heater is detected.

The present disclosure reduces power consumption during on-peak hours by reducing the energy demand on the power generation facility, and also enabling the user/consumer to pay less to operate the appliance on an annual basis.

This disclosure is a low-cost alternative to using expensive or complicated methods of determining when peak electrical rates apply. For example, when the refrigerator is in peak shaving mode (or it could be programmed to do this constantly), an ambient light sensor determines when it is morning, and then stays in energy-saving mode for a predetermined number of hours. Preferably, the system will need a counter to know that the room has been dark for a predetermined number of hours. When the lights come on for a certain length of time, then the system knows, for example, that it is morning.

This disclosure provides a peak-shaving appliance such as a refrigerator, including a method to determine when to go into peak-shaving mode without using additional components, or components that have another purpose, and provides a high percentage of the maximum benefit for negligible cost. The two components needed for this are an ambient light sensor and a timer. The kitchen will be dark for an extended period of time while everyone is sleeping. The light sensor and the timer will be used to determine that it is nighttime and morning can be determined by the light sensor. When the refrigerator determines it is morning, the timer will be used to initiate peak shaving mode after some delay time. For example, peak shaving mode could start three hours after it is determined morning starts. Similarly, the ambient light sensor can also be used for dimming the refrigerator lights. This disclosure advantageously uses ambient light to determine when to start peak shaving.

An appliance interface can be provided for all appliances leaving the module to communicate with the AMI system. The system provides for appliance sales with a Demand Side Management capable appliance. The Demand Side Management Module (DSMM) is provided to control the energy consumption and control functions of an appliance using a communication method (including but not limited to PLC, FM, AM SSB, WiFi, ZigBee, Radio Broadcast Data System, 802.11, 802.15.4, etc.). The modular approach will enable an appliance to match electrical utility communication requirements. Each electrical utility region may have different communication methods, protocol methods, etc. This modular approach allows an appliance to be adapted to a particular geographical area of a consumer or a particular electrical provider. The module can be added as a follow on feature and applied after the appliance is installed. Typical installations could include an integral mounted module (inside the appliance or unit) or an externally mounted module (at the wall electrical receptacle or anywhere outside the appliance or unit). The module in this disclosure provides for 2 way communications if needed, and will provide for several states of operation—for example, 1) normal operation, 2) operation in low energy mode (but not off), and 3) operation in lowest energy mode.

This module could be powered from the appliance or via a separate power supply, or with rechargeable batteries. The rechargeable batteries could be set to charge under off-peak conditions. With the module powered from the appliance, the appliance could turn it off until the appliance needed to make a decision about power usage, eliminating the standby power draw of the module. If powered separately, the appliance could go to a low energy state or completely off, while the module continued to monitor rates.

Use of RFID tags in one proposed system should offer significant savings since the RFID tags have become very low cost due to the proliferation of these devices in retail and will effectively allow the enabled appliance to effectively communicate with the utility meter (e.g., receive signals from the utility meter). This system makes it very easy for a customer to manage energy usage during peak demand periods and lowers the inconvenience level to the customer by not shutting off appliances in the home by the utility. When local storage and local generation are integrated into the system, then cost savings are seen by the customer. This system also solves the issue of rolling brownouts/blackouts caused by excessive power demand by lowering the overall demand. Also, the system allows the customer to pre-program choices into the system that will ultimately lower utility demand as well as save the customer money in the customer's utility billing. For instance, the customer may choose to disable the defrost cycle of a refrigerator during peak rate timeframes. This disclosure provides for the controller to "communicate" with the internal appliance control board and command the appliance to execute specific actions with no curtailment in the energy supply. This disclosure further provides a method of communicating data between a master device and one or more slave devices using RFID technology. This can be a number of states or signals, either using one or more passive RFID tags that resonate at different frequencies resonated by the master, or one or more active RFID tags that can store data that can be manipulated by the master device and read by the slave device(s). The states in either the passive or active RFID tags can then be read by the microcontroller on the slave device(s) and appropriate functions /actions can be taken based upon these signals.

Another exemplary embodiment uses continuous coded tones riding on carrier frequencies to transmit intelligence, for example, when one is merely passing rate information such as rate 1, 2, 3, or 4, using the tones to transmit the signals. One could further enhance the details of the messaging by assigning a binary number to a given tone, thus allowing one to "spell out" a message using binary coding with multiple tones. The appliance microcomputer would be programmed to respond to a given number that would arrive in binary format.

One advantage of this approach is that customers have complete control of their power. There have been proposals by utilities to shut off customers if they exceed demand limits or increase the number of rolling brownouts. This method also gives a customer finer granularity in their home in terms of control. A customer does not have to load shed a room just to manage a single device.

This disclosure also advantageously provides modes of load shedding in the appliance, lighting, or HVAC other than "on/off" to make the situation more acceptable from the perspective of the customer.

An advantage of the present disclosure is the ability to produce appliances with a common interface and let the module deal with the Demand Side Management.

Another advantage is the ability to control functions and features within the appliance and/or unit at various energy levels, i.e., as opposed to just an on/off function.

Another advantage is that the consumer can choose the module or choose not to have the module. If the module is chosen, it can be matched to the particular electrical utility service provider communication method of the consumer.

Another benefit is the increased flexibility with an associated electrical service provider, and the provision of several modes of operation (not simply an on/off mode). The module can be placed or positioned inside or outside the appliance and/or unit to provide demand side management.

Still other benefits relate to modularity, the ability to handle multiple communication methods and protocols without adversely impacting the cost of the appliance, opening up appliances to a variety of protocols, enabling demand side management or energy management, and/or providing for a standard interface to the appliance (for example, offering prechill and/or temperature set change during on-peak hours).

Low cost, reliable RF transmissions within the home, rather than using industrial solutions such as PLC or Zigbee solutions which are significantly more costly than the aforementioned system.

Still other features and benefits of the present disclosure will become apparent from reading and understanding the following detailed description.

BRIEF DESCRIPTION OF THE DRAWINGS

The following figures illustrate various systems and methods in accordance with the exemplary embodiments described herein:

FIG. 9*a* is one-half of a chart illustrating different appliance displays in response to varying electrical rates;

FIG. 9*b* is the other half of the chart of FIG. 9*a* illustrating different appliance displays in response to varying electrical rates;

FIG. 10 is a schematic view of an exemplary user interface;

FIG. 11 is an exemplary schedule based on time of use;

FIG. 13 is an exemplary day of the week peak demand schedule for use with an exemplary home management system;

FIG. 20 is exemplary actions for off peak scheduling; and

FIG. 21 is exemplary modes for appliance actions and responses

DETAILED DESCRIPTION OF THE PREFERRED EMBODIMENTS

Figure 1:
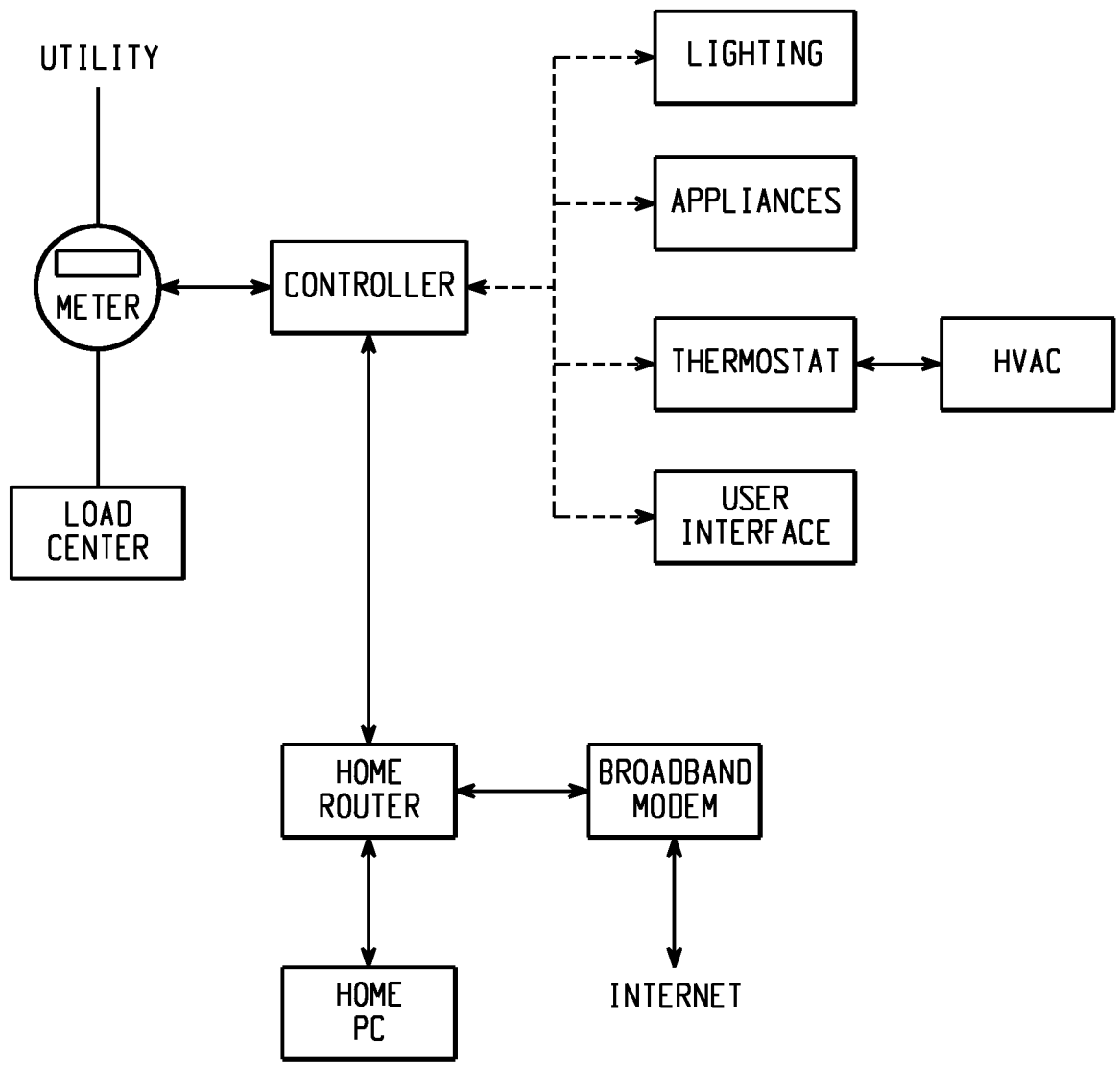
FIG. 1 is a schematic view of an exemplary energy management system for household appliances.
Figure 2:
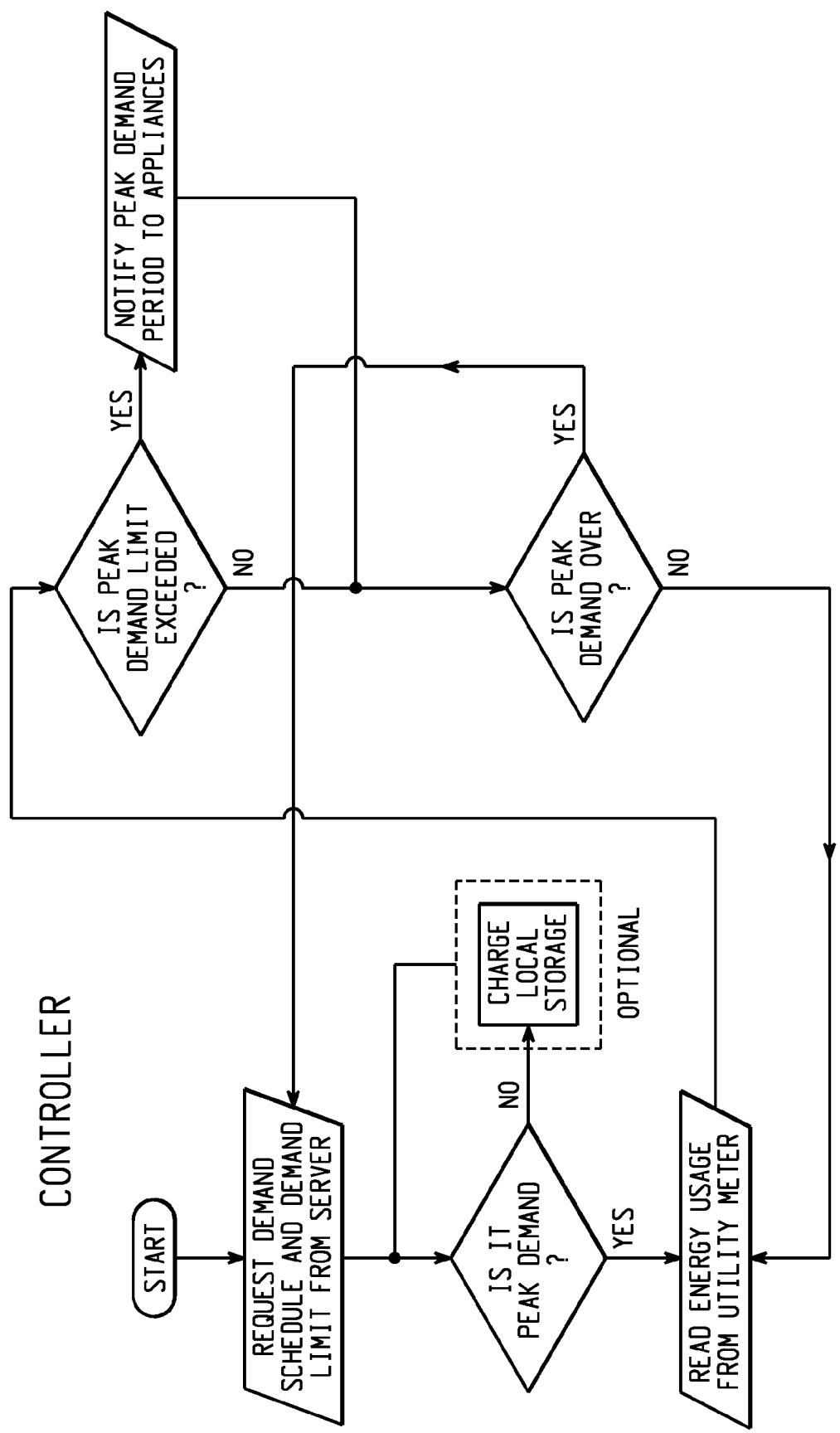
FIG. 2 is a process flow diagram illustrating an exemplary method for configuring appliances for operation during peak demand.

In one embodiment, a more advanced system is provided to handle energy management between the utility and the homeowner's appliances. The system can include one or more of the following: a controller, utility meter, load center, communication network, lighting, intelligent appliances, thermostat/HVAC, user interface, home router, home PC, broadband modem, internet, local storage, local generator and/or demand server. Less advanced systems may actually allow the appliance to "communicate directly with the utility meter or mesh network through the DSSM (Demand Side Management Module) (FIG. 1). Turning to FIG. 2, the controller requests the demand schedule and demand limit from the server. The demand server is a computer system that notifies the controller when the utility is in peak demand and what is the utility's current demand limit. A utility meter can also provide the controller the occurrence of peak demand and demand limit. If there is a determination that it is peak demand, the energy usage from the utility meter is read. If not, local storage may optionally be charged. The demand limit can also be set by the home owner. Additionally, the homeowner can choose to force various modes in the appliance control based on the rate the utility is charging at different times of the day. The controller will look at the energy consumption currently used by the home via the utility meter and see if the home is exceeding the demand limit read from the server. If the demand limit is exceeded, the controller will notify the intelligent appliances, lighting and thermostat/HVAC of the peak demand period (FIG. 2). If the peak demand limit is not exceeded, a determination is made as to whether or not the peak demand is over. If yes, the controller continues to request the demand schedule and demand limit from the server, If no, the controller continues to loop through reading the energy usage, determining if the peak demand limit is exceeded and notifying the appliances accordingly as seen in FIG. 2.

Figure 3:
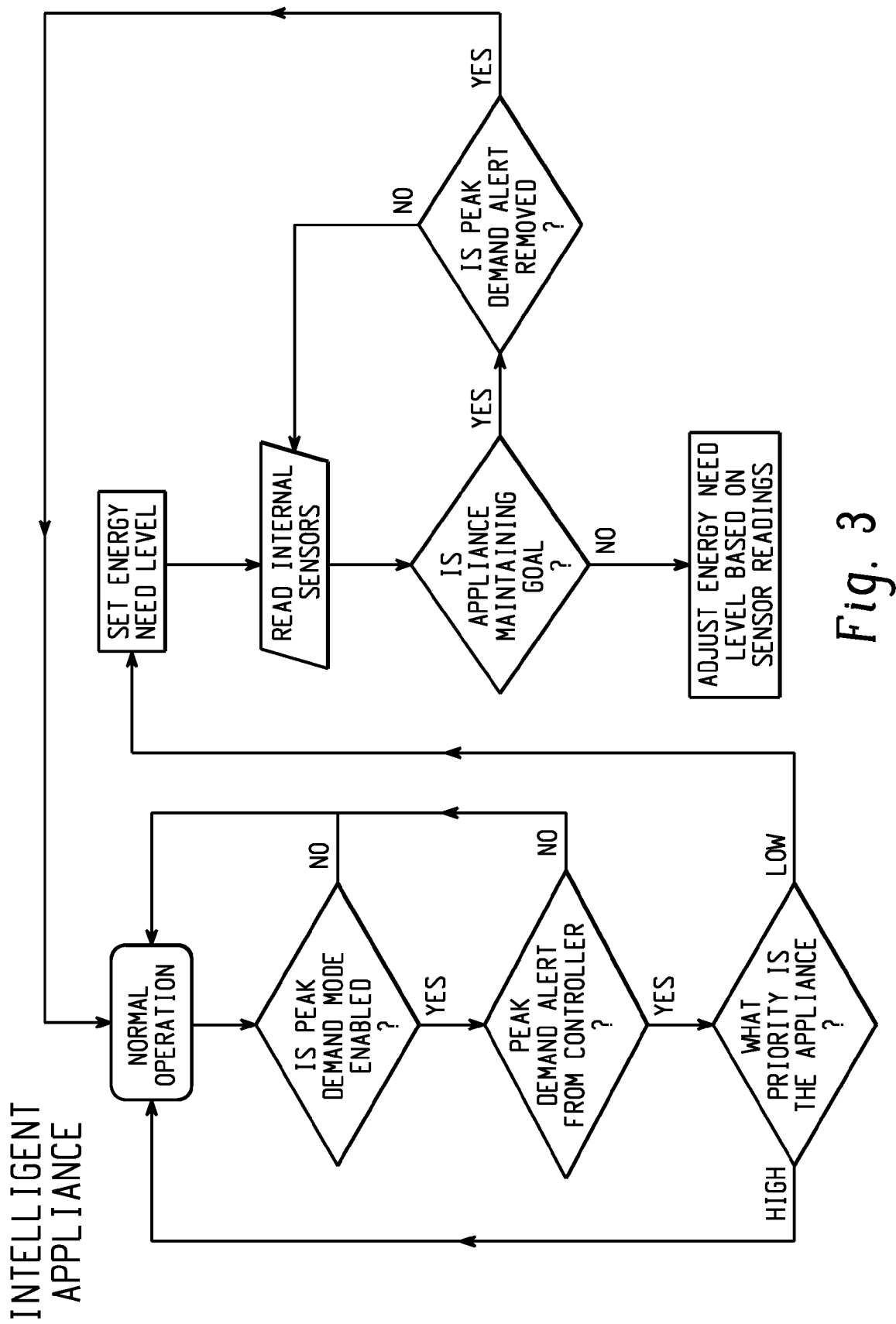
FIG. 3 is a process flow diagram illustrating an exemplary method for an intelligent appliance to link itself to a home energy management device.

Each intelligent appliance has a communication interface that links itself to the controller (FIG. 3). This interface can be power-line carrier, wireless, and/or wired. The controller will interact with the appliance and lighting controls as well as thermostat (for HVAC) to execute the users preferences/settings. As seen in FIG. 3, the intelligent appliance will determine if peak demand mode is enabled. If no, normal operation will occur. If yes, the intelligent appliance determines if a peak demand alert has been received from the controller. If no, normal operation will occur. If yes, the intelligent appliance determines the priority for that appliance. If the appliance has a high priority, normal operation occurs. If the appliance has a low priority, then the energy need level is set and internal sensors are read. The intelligent appliance determines if that appliance is maintaining its goal. If not, the energy need level is adjusted based on the sensor readings, If yes, the intelligent appliance determines if the peak demand alert is removed. If yet, normal operation will occur, If no, the intelligent appliance loops to read the internal settings.

Enabled appliances receive signals from the utility meter and help lower the peak load on the utility and lower the amount of energy that the consumer uses during high energy cost periods of the day. There are several ways to accomplish this, through wireless communication (ZigBee, WiFi, etc) or through PLC (power line carrier) communication. Alternatively, using passive RFID tags that resonate at different frequencies resonated by the master, or one or more active RFID tags that can store data that can be manipulated by the master device and read by the slave devices(s) is an effective and potentially lower cost communication solution since there is no protocol. Rather, a pulse of energy at a particular frequency will allow a low cost method with an open protocol for transmitting/communicating between a master device and one or more slave devices, and appropriate functions/actions can be taken based upon these signals.

Figure 4:
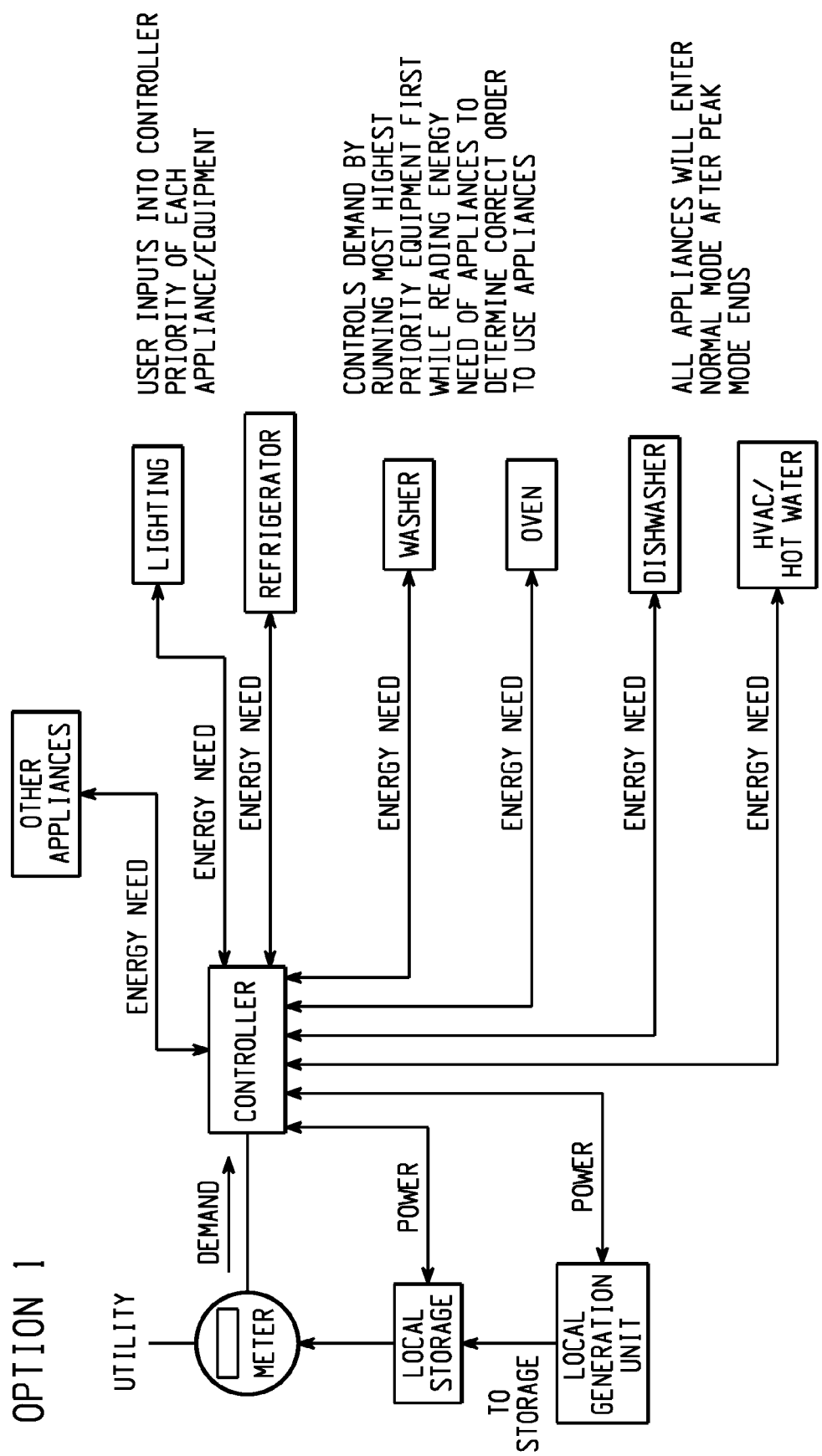
FIG. 4 is a schematic view of an exemplary control scheme based on energy need.

The interaction between controller and appliances can occur in two ways. For example, in one scenario during a peak demand period, the controller will receive a demand limit from the utility, demand server or user. The controller will then allocate the home's demand based on two factors: priority of the appliance and energy need level (FIG. 4). The user inputs into the controller a priority for each appliance/equipment. The priority dictates which appliances have higher priority to be in full or partial energy mode than other appliances. Energy need dictates how much energy is required for a certain time period in order for that appliance to function properly. In other words, the controls demand by running the most highest priority equipment first while reading an energy needs of the appliances to determine a correct order to use the appliances. If the appliance's energy need is too low to function properly, the appliance moves to a normal mode or a higher energy need level. The energy saving mode is typically a lower energy usage mode for the appliance such as shutdowns of compressors and motors, delayed cycles, higher operating temperatures in summer or lower operating temperatures in winter until the peak demand period is over. Once the demand limit is reached, the appliances will stay in their energy mode until peak demand is over, when the appliances will enter normal mode, or a user overrides, or appliance finishes need cycle or priority changes. The controller constantly receives status updates from the appliances in order to determine which state they are in and in order to determine if priorities need to change to accomplish the system goals.

Figure 5:
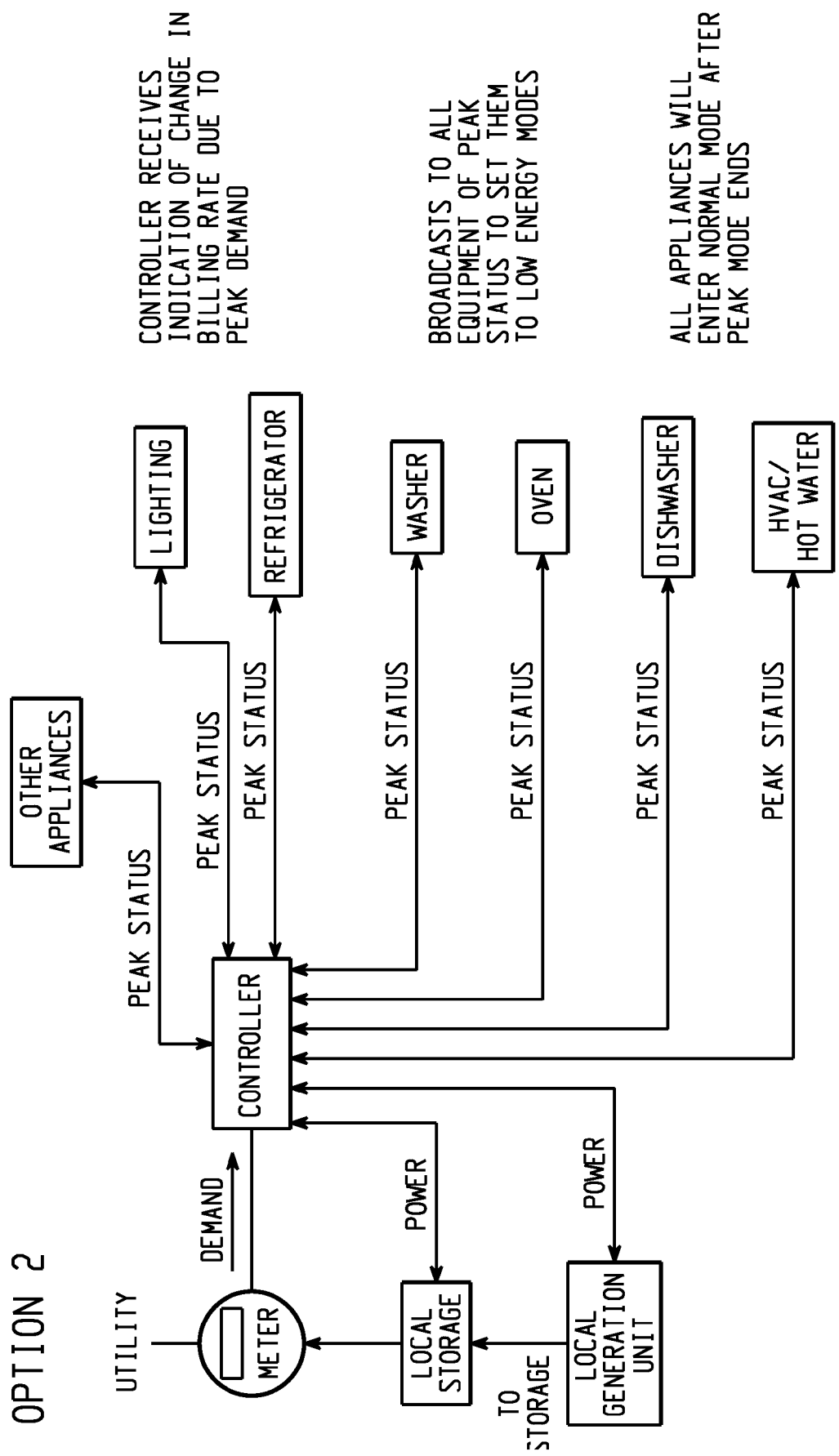
FIG. 5 is a schematic view of an exemplary control scheme based on peak status.

In a second scenario, for example, a set point is provided. During a peak demand period, the controller sends a peak status indication to each appliance and will tell each appliance to go into peak demand mode (FIG. 5). The controller receives indication of a change in a billing rate due to the peak demand period indicator received from the utility. The controller broadcasts to all equipment of the peak status to set the equipment into low energy modes. The appliance will then go into a lower energy mode, and will enter normal mode after the peak mode ends. The customer can deactivate the energy savings mode by selecting a feature on the appliance front end controls (i.e. user interface board) before or during the appliance use or at the controller. The controller can also communicate to a local storage or power generation unit. This local unit is connected to the incoming power supply from the utility. The controller notifies the storage unit to charge when it is not in peak. demand, if a storage unit is included and available. If the storage unit has enough energy to supply the appliances during, peak demand, then the controller will switch the home's energy consumption from the utility to the storage unit. The unit can also be local generator/storage such as solar, hydrogen fuel cell, etc.

Figure 6:
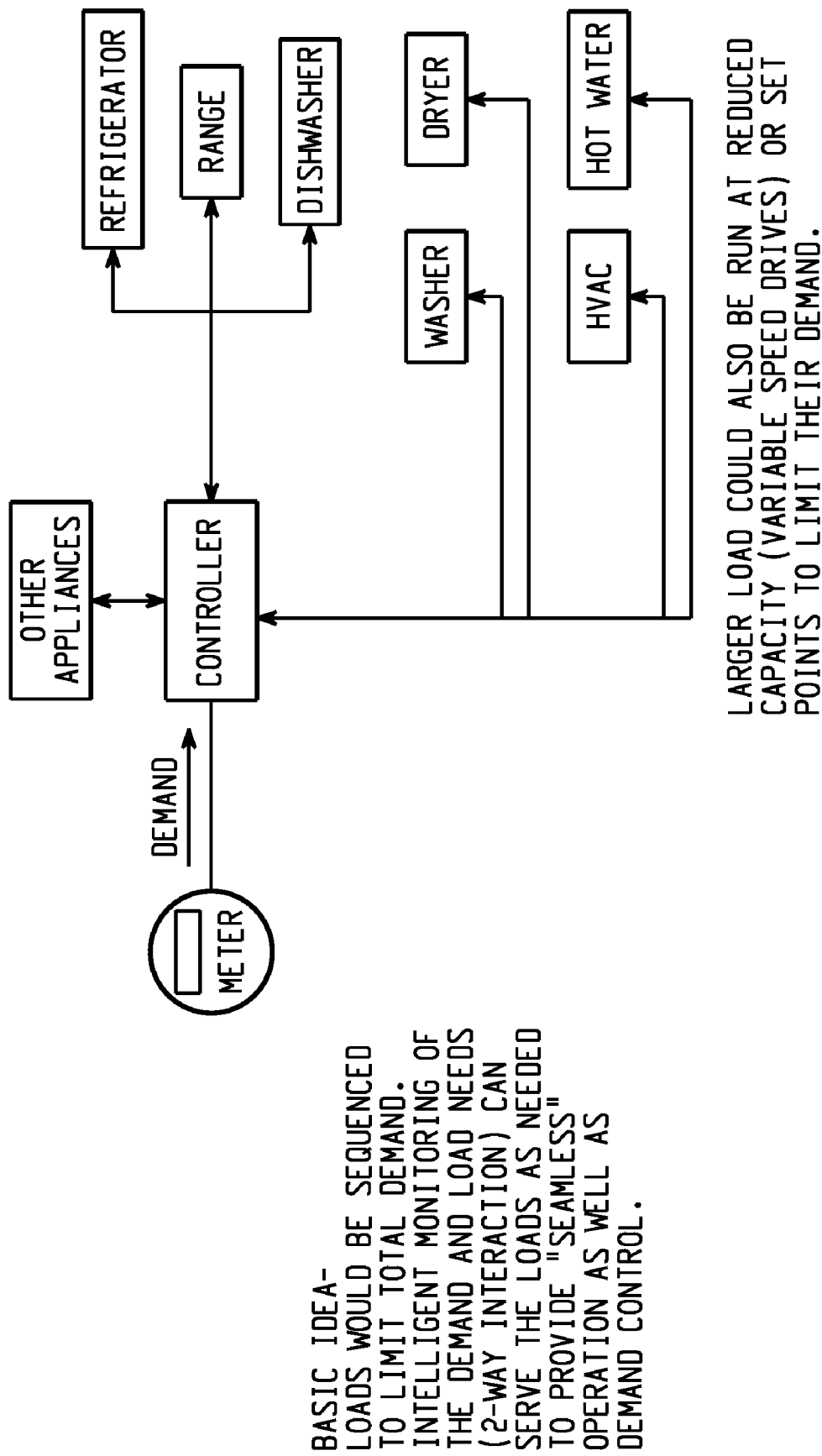
FIG. 6 is a schematic view of an exemplary control scheme based on priority and energy need.
Figure 7:
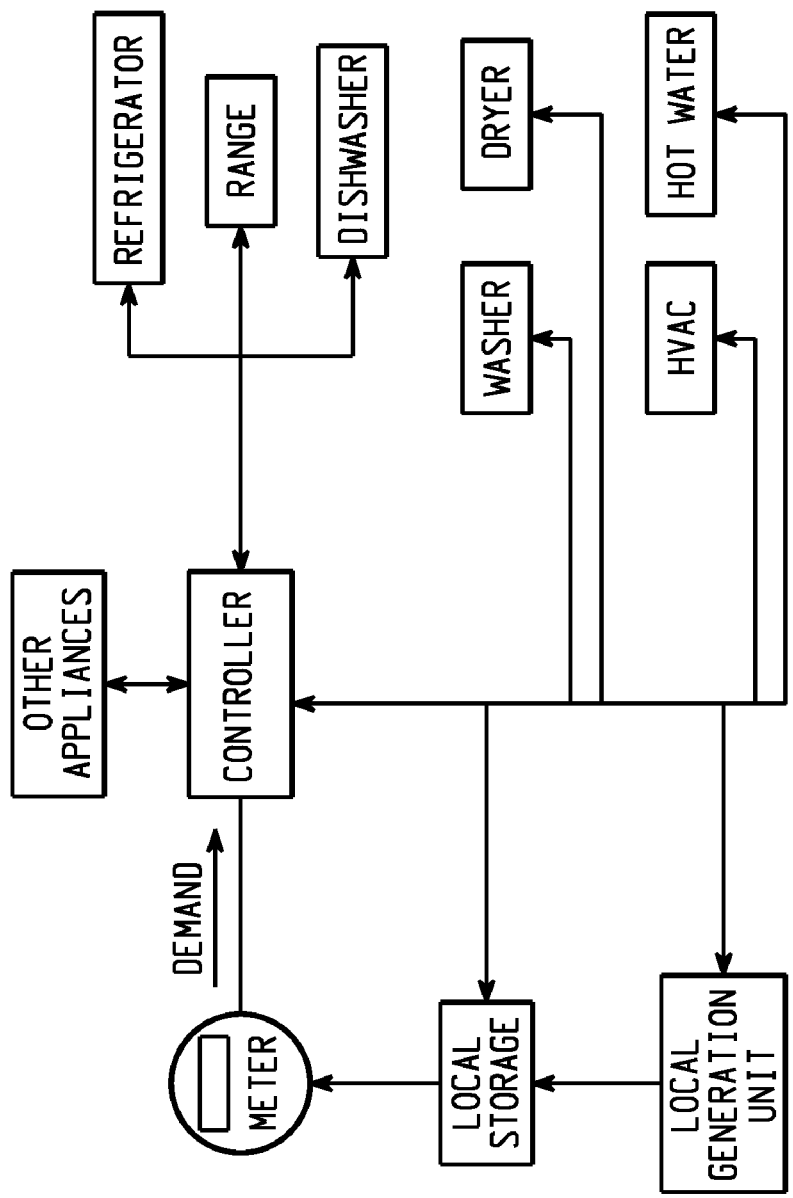
FIG. 7 is the schematic view of the embodiment of FIG. 6 including local energy storage and/or generation.
Figure 8:
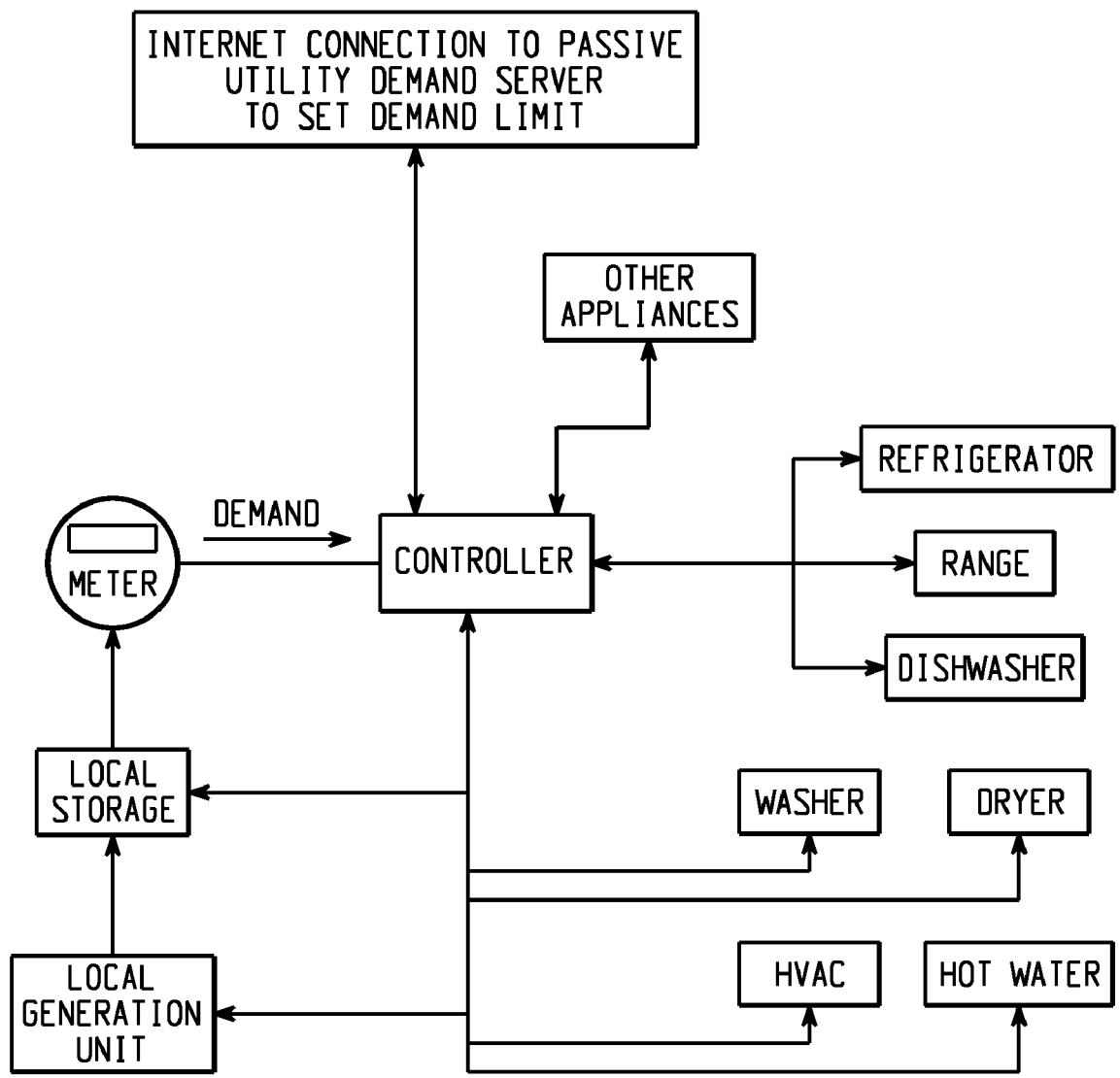
FIG. 8 is the schematic view of the embodiment of FIG. 7 including an internet connection.

The central controller handles energy management between the utility and home appliances, lighting, thermostat/HVAC, etc. with customer choices incorporated in the decision making process. The controller may include notification of an energy saving mode based on demand limit read from one or more of a utility meter, utility, demand server or user. An energy savings mode of an appliance can thereby be controlled or regulated based on priority and energy need level sent from the controller and/or the customer (FIG. 6). As a basic idea, loads would be sequenced to limit total demand. Intelligent monitoring of the demand and load needs a (2-way interaction) can serve the loads as needed to provide seamless operation as well as demand control. As seen FIG. 6, a larger load could also be run at a reduced capacity (variable speed drives) or set points to limit their demand. Likewise, consideration to use of local energy storage and use of a local generator to offset peak demand limit can be incorporated into the energy management considerations, or provide the ability to override mode of energy savings through the controller or at the appliance, lighting, or thermostat/HVAC (FIGS. 7 and 8). As seen in FIGS. 7 and 8, local storage could also be used for demand control. Local generation could be used for local consumption, storage, or sale based on needs and time of day for a most effective financial return. As seen in FIG. 8. an internet connection can be made with the controller to set the demand limit from a passive utility demand server.

The present disclosure has the ability for the home to shed loads in pending brown-out or black-out situations, yet have intelligence to prevent an improper action such as shutting down the refrigerator for extended timeframes that might compromise food storage safety.

How much energy the appliance consumes in peak demand is based on priority of the device and the energy need level. If the appliance's priority is high, then the appliance will most likely not go into a saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

The controller will be the main product with the communication and settings control incorporated within future appliances. Specific meters will be selected so that the controller can read the demand usage. It is intended that the demand server will possibly be purchased or leased to the utility.

A method is provided for constructing an appliance designed to perform any key function, the appliance comprises of several mechanical and electrical elements controlled by a main controller. This main controller has a port for receiving information regarding the operational state of the appliance. The port also has a user interface or switch which could be used to override the information received by the controller through the port. Two-way or one-way communication devices may be connected to the port. These communication devices will receive signals from a remote controller, process those signals and as a result communicate an operational state to the main controller of the appliance. This operational state is communicated to the main controller by one or more remote controllers in a specific format determined by the appliance. These signals from the remote controller(s) could be based on a variety of communication methods and associated protocols. On receiving the operational state signal, the appliance main controller causes the appliance to run a predetermined operational mode. These operational modes are designed into the appliance(s) and result in different resource consumption levels or patterns, even delaying use. Resources could include energy, water, air, heat, sunlight, time, etc. In future appliance models, the consumer might be given the authority to modify the appliance responses to a given rate signal. The consumer would be presented a "check box" of potential response modes and allowed to choose within set parameters. For instance, the consumer might be allowed to choose the amount of temperature adjustment a refrigerator will make in response to a high utility rate.

A method of communicating data between a master device and one or more slave devices may advantageously use continuous tone-coded transmission system. This can be a number of states or signals, either using one or more continuous tones that signify different rate states coming from the home area network (from meter) or the utility. Additionally, one could send a combination of tones to transmit binary messages using a few tones. The slave devices will incorporate a receiver that receives the carrier frequency and then decodes the continuous tone which corresponds to the particular state of the utility rate. Once the "receiver board" detects the tone, then the downstream circuitry will trigger the appropriate response in the appliance. The carrier frequency in this scheme can be numerous spectrums, one being the FM broadcast band or a specific FM band allocated by the FCC for low level power output. The advantage of broadcast band FM is the low cost of such devices and the potential to penetrate walls, etc. within a home with very low levels of power due to the long wavelength of the 89-106 Mhz carrier. This process is used today in 2-way radio communications to reduce the annoyance of listening to multiple users on shared 2-way radio frequencies. The process in these radios is referred to as CTCSS (continuous tone-coded squelch system) and would find application in this end use.

Generally, it is not known to have modular interfaces that can receive signals from a control source. Also, no prior arrangements have functioned by addressing the control board of the appliance with a signal that directs the appliance to respond.

Thus, by way of example only, the structure and/or operation of a refrigerator (FIG. 9, although other appliances are also represented) may be modified or altered by reducing the temperature, especially in the freezer compartment pre on-peak time and further temporarily provide a compartment temperature increase to shave on-peak load. Specifically, defrost operation could be delayed until off-peak time. Alternatively or conjunctively, the freezer and refrigerator temperature setpoints may be set to maintain less compressor on time during on-peak demand times. Similarly, the refrigerator/freezer could be programmed so that lights will not be permitted to come on or the lights must be dimmed lights during on-peak demand times. During on-peak demand times, the fan operating speeds can be reduced, and/or compressor operating speed reduced in order to reduce energy consumption. Still another option is to reduce the delay time for the door alarm to sound during on-peak time. Other power load reducing measures in a refrigerator may include (reducing before on-peak hours) the temperature of the freezer and refrigerator compartments in a refrigerator (prechill) and slightly increase temperature setting during on-peak rates. For example, just before peak rate time, the temperature setting could be decreased by 1-2 degrees (during off-peak rates). Some communication line with the electrical company could be established. Thus, the electrical company may be able to send a signal in advance to prechill the refrigerator (or in the case of an air conditioner, decrease the room temperature during off-peak rates as a pre-chill maneuver) and, in turn, increase the temperature setting during on-peak rates.

Figure 12:
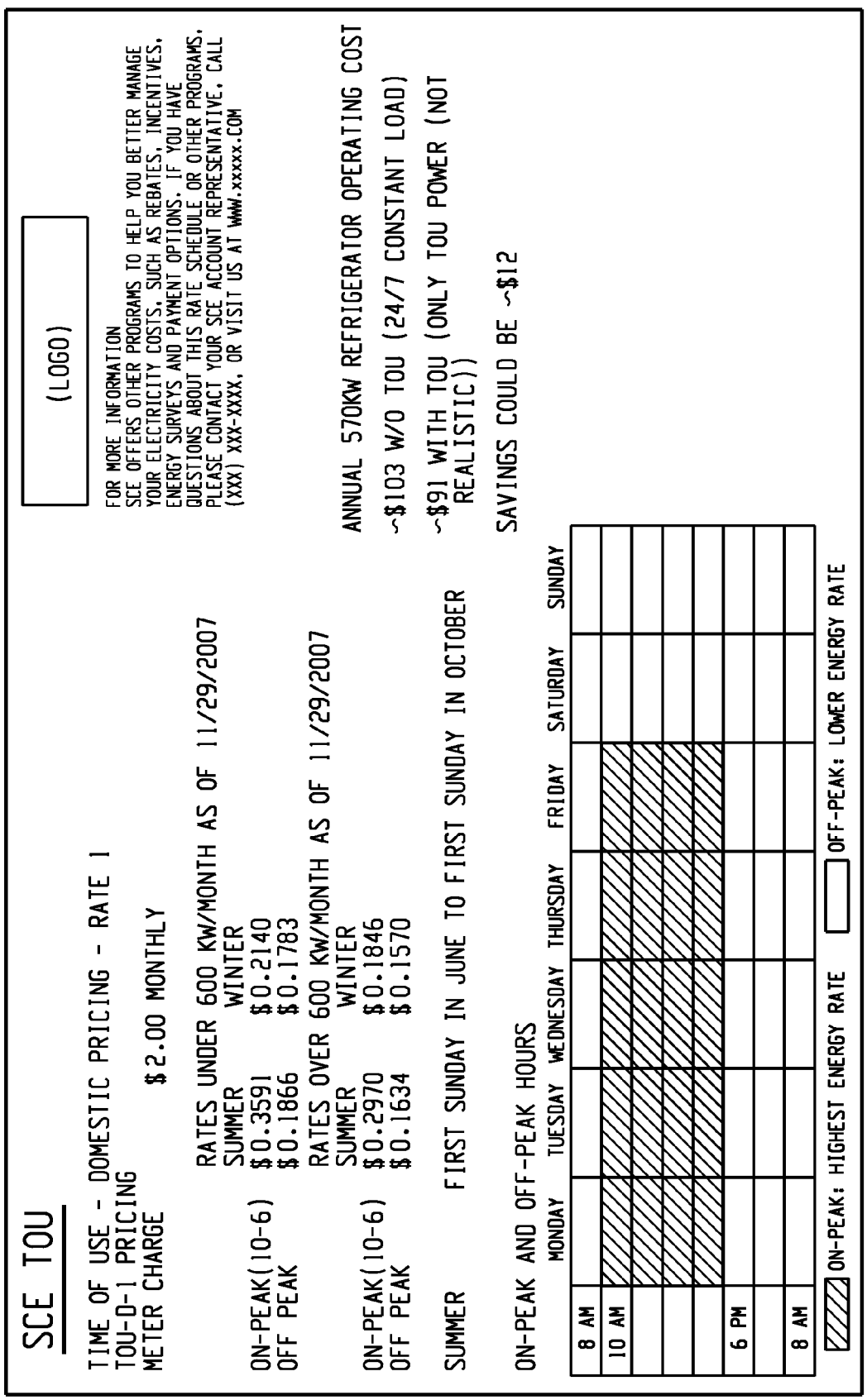
FIG. 12 is an exemplary time of use utility rate chart for use with an exemplary home management system.

Still other energy consuming practices of the exemplary refrigerator that may be altered include turning the ice-maker off during on-peak demand times, or disabling the crushed ice mode during on-peak demand times. Alternatively, the consumer may be given the ability to select via a user interface which items are incorporated into the on-peak demand via an enable/disable menu, or to provide input selection such as entry of a zip code (FIG. 10) in order to select the utility company and time of use schedule (FIG. 11), or using a time versus day of the week schedule input method (FIGS. 12-13). As seen in FIG.11 a background and parts of the system is depicted for an electric power utility time of use as applied to refrigeration. As background, the "time of use" is a voluntary electric utility program which allows a consumer to purchase lower priced electric power by using power when the "grid" electric demand is less. The "time-of-use" schedule is generally worked out with the regional power company and legislators and the schedule is well known and easily obtained by the consumer. System implementation has three unique categories and are listed below. The first unique category includes a method of inputting the "time-of-use" schedule includes (A) consumer zip code entry which requires a database managed by a company and upgradeable and (B) time versus day of the week peak demand schedule with user input, which requires initial input by the consumer and the database managed by the user when changes happen. The second unique category includes making changes to electronic circuitry that keeps time and software to interact with the time-of use schedule input and actions would be required. One method would be a zero cross and another method would be a clock calendar IC with capacitor or battery backup. The third unique category includes a list of actions that could be performed at times when the electric rates are off peak, as seen for instance in FIG. 20, discussed hereinbelow.

Figure 14:
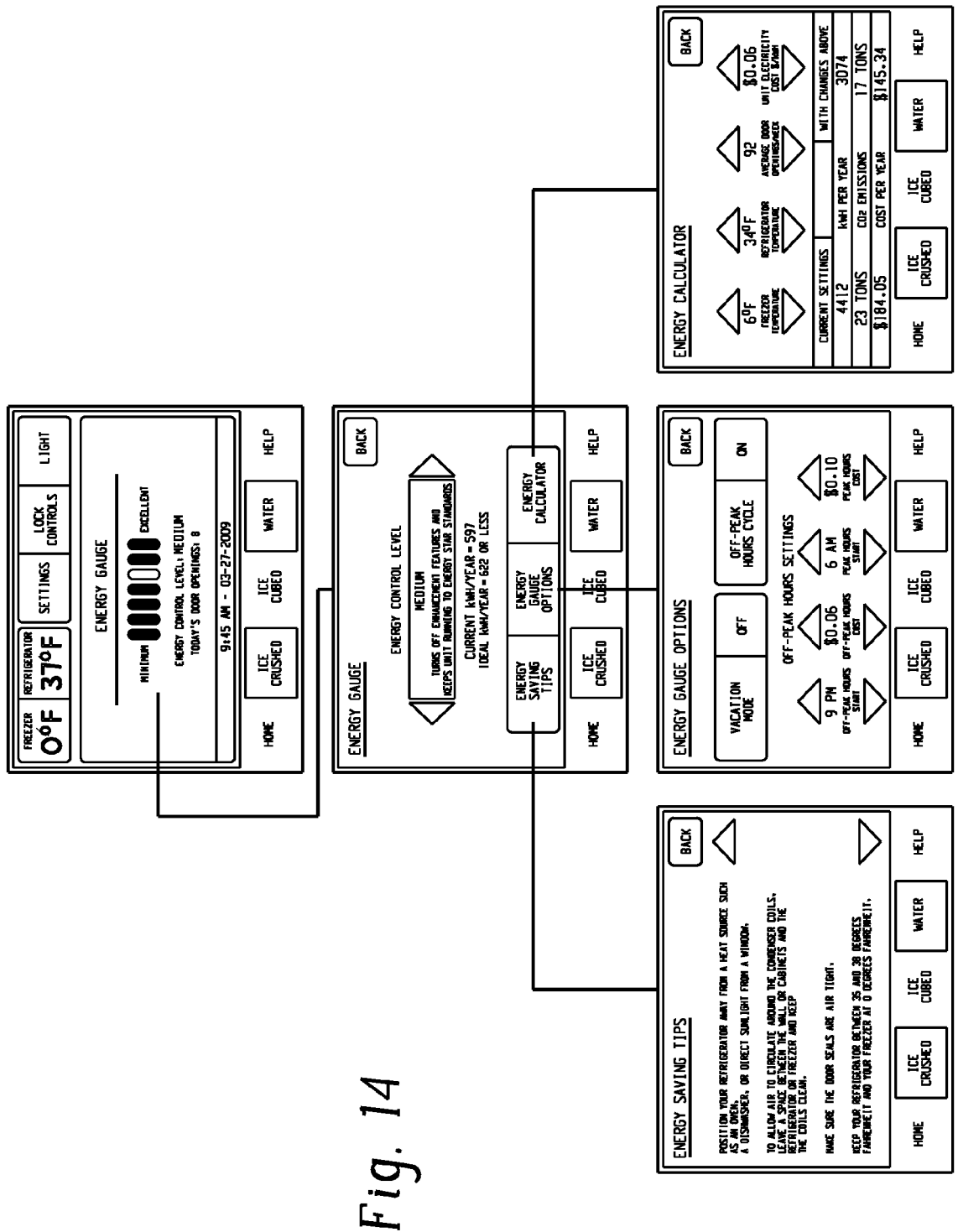
FIG. 14 is an exemplary user interface.
Figure 15:
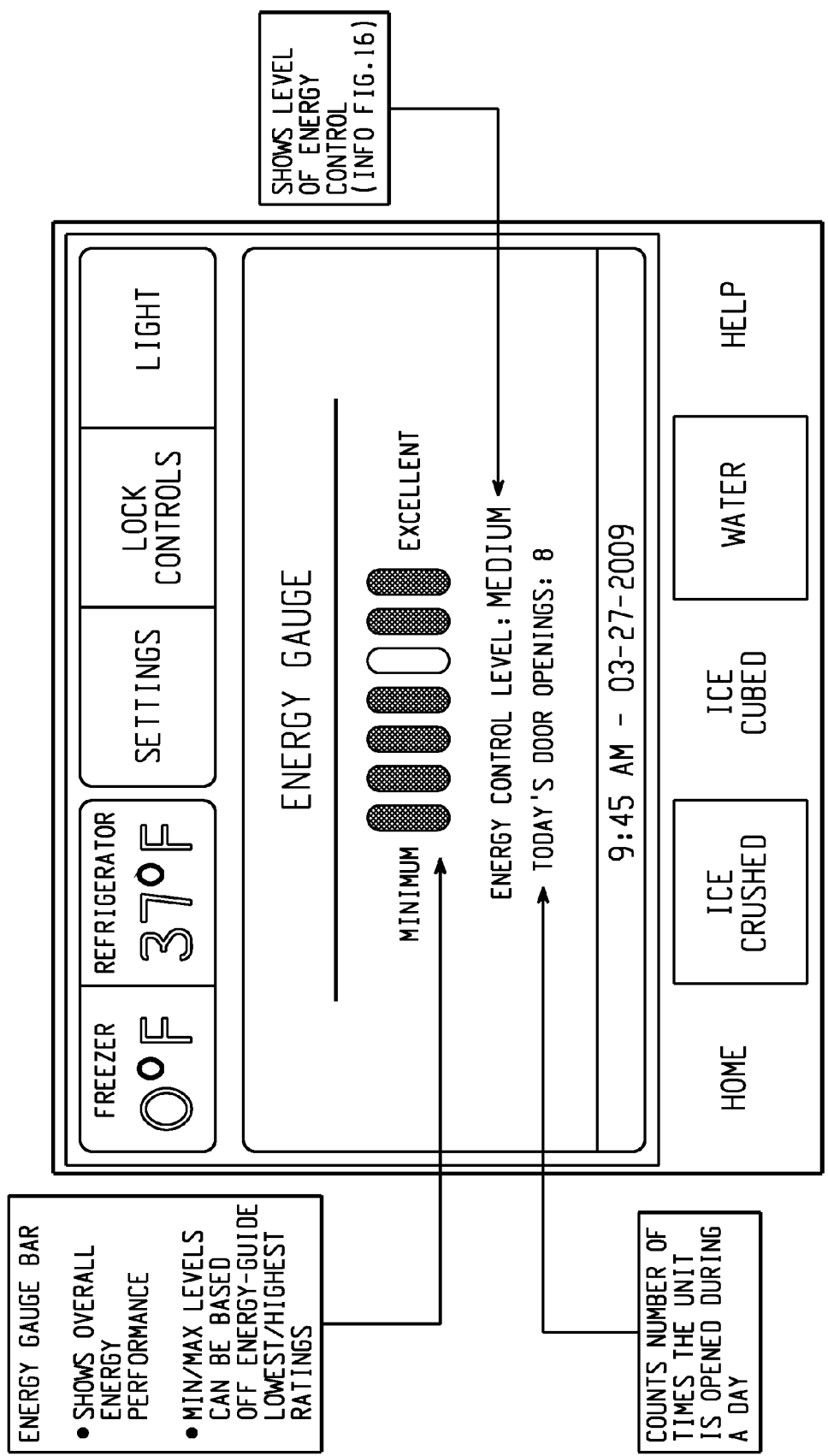
FIG. 15 is an enlarged portion of the exemplary user interface of FIG. 14.
Figure 16:
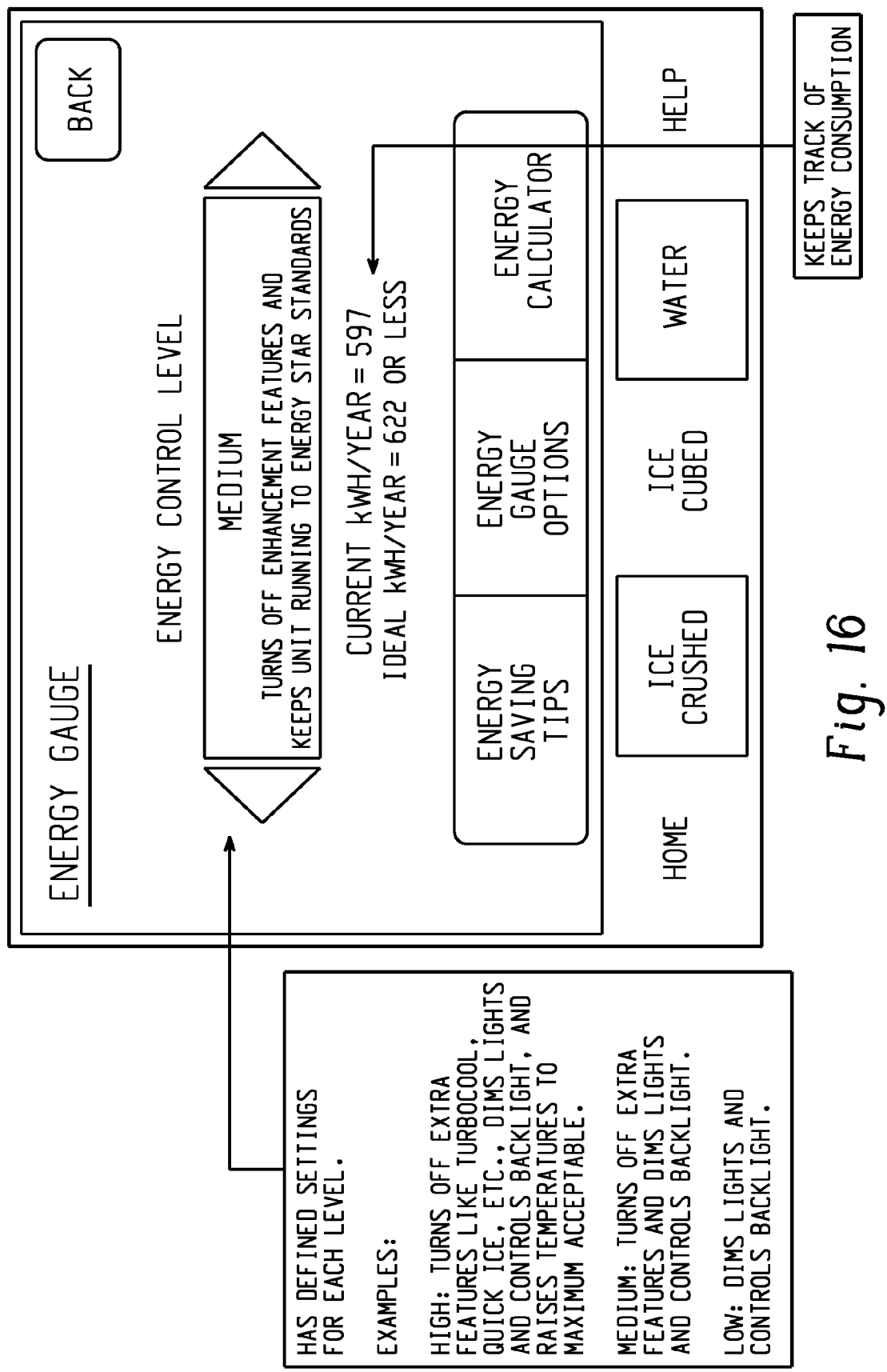
FIG. 16 is another enlarged portion of the exemplary user interface of FIG. 14.
Figure 17:
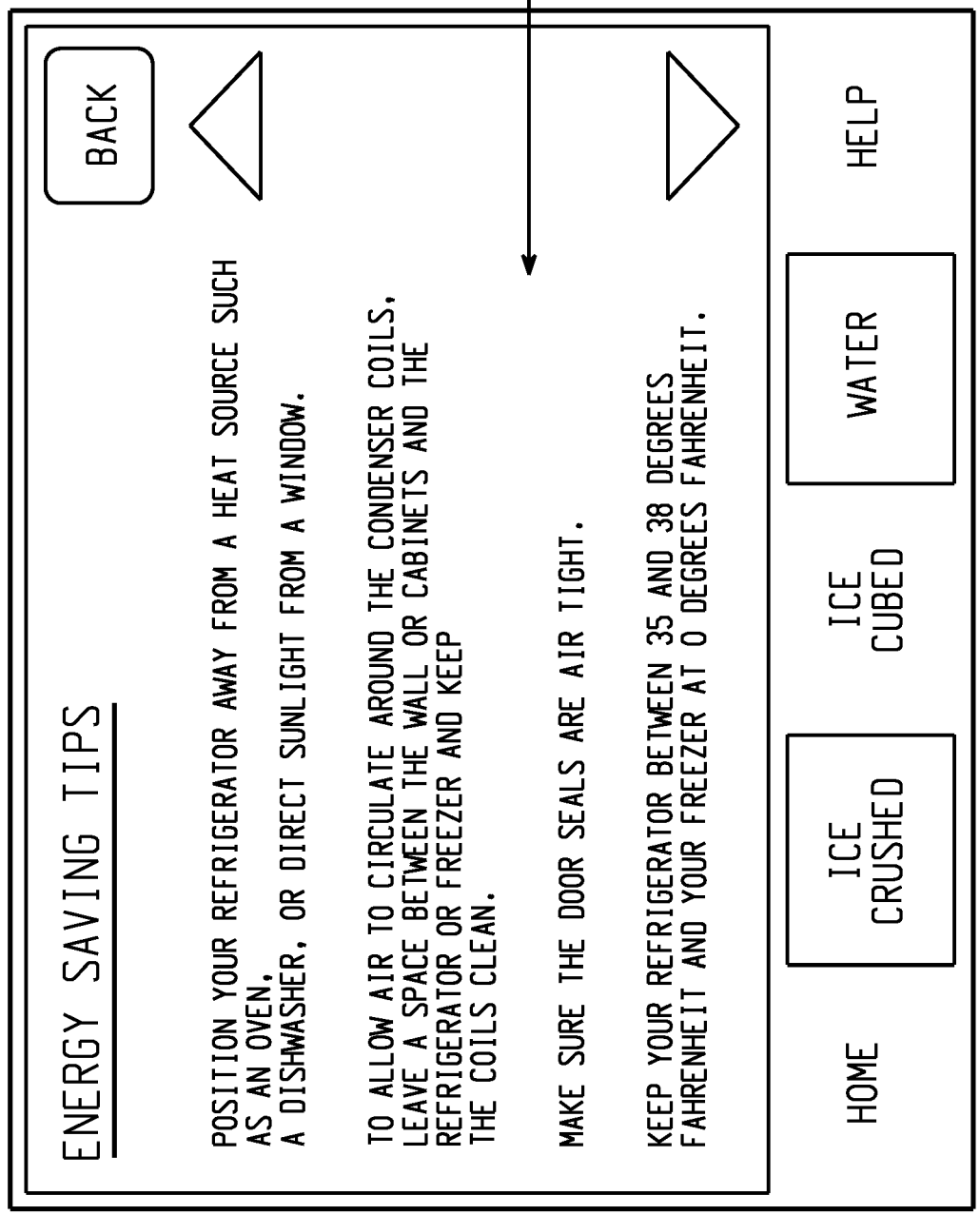
FIG. 17 is another enlarged portion of the exemplary user interface of FIG. 14.
Figure 18:
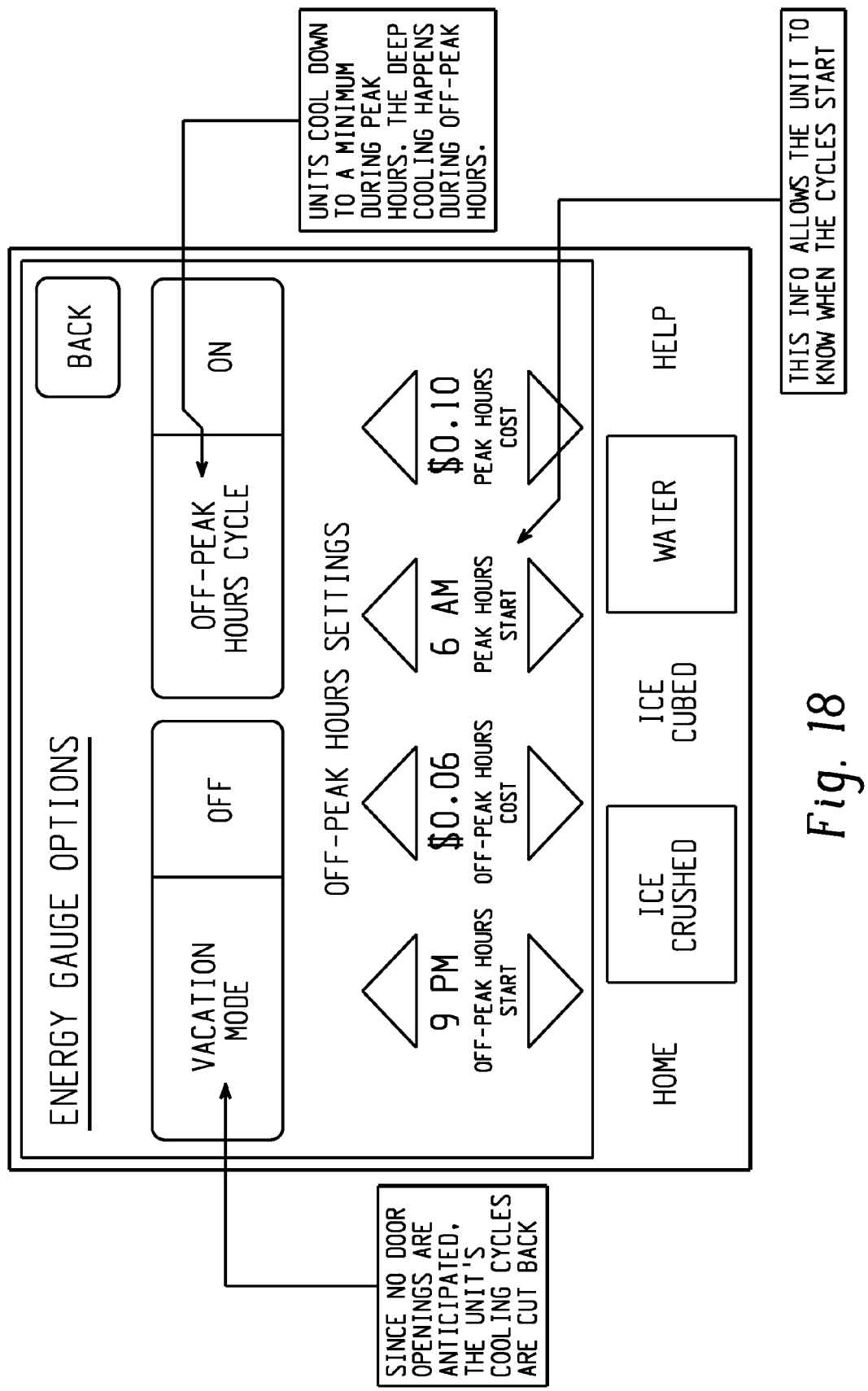
FIG. 18 is another enlarged portion of the exemplary user interface of FIG. 14.
Figure 19:
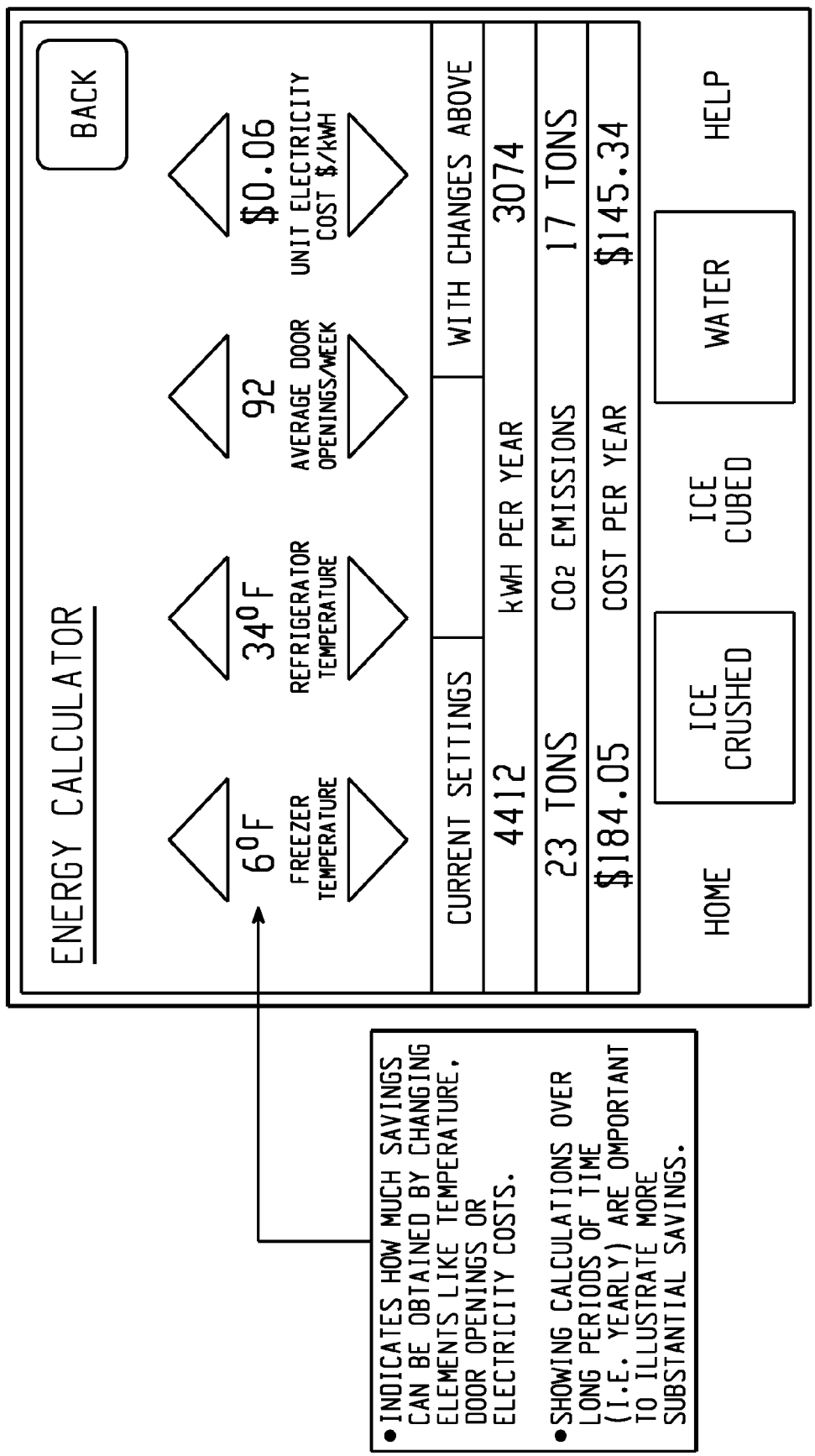
FIG. 19 is another enlarged portion of the exemplary user interface of FIG. 14.

The user interface may also incorporate suggested energy saving tips or show energy usage, or provide an indicator during on-peak mode, or provide a counter to illustrate the energy impact of door opening, or showing an energy calculator to the consumer to serve as a reminder of the impact of certain selections/actions on energy use or energy conservation (see, for instance, FIGS. 14, which is explained in more detail with reference to FIGS. 15-19). As seen for instance in FIG. 15, the user interface allows for selection of freezer temperature (0° F), refrigerator temperature (32° F.), settings, lock controls, and a light. In addition, an energy gauge shows a range from minimum to excellent of actual energy used a current energy control level, e.g., "medium", today's door openings, e.g. "8", the current day/time, and other selectable inputs labeled home, ice crushed, ice cubed, water, and help. The energy gauge bar shows overall energy performance and min/max levels can be based off energy-guide lowest/highest ratings. The energy control level includes a current status, such as medium, and shows level of energy control, while the "today's door openings:" indicator counts the number of times the unit is opened during a day and indicates that number, i.e. 8. FIG. 16 depicts the user interface including expanded energy control level information. For instance the defined settings for various levels can be displayed and defined. As an example, "low" may be defined as "dims lights and controls backlight", "medium" may be defined as "turns off extra features and dims lights and controls backlight", and "high" may be defined as "turns off extra features like turbo cool, quick ice, etc., dims lights and controls backlight, and. raises temperatures to maximum acceptable." The user interface may further display information for the setting, such as for "medium" the following may be displayed: "turns off enhancement features and keeps unit running to energy star standards." The user interface additionally keeps track of energy consumption and displays the current kWH/year, e.g. "597" and the ideal kWH/year, e.g. "622 or less." In this mode further selectable features appear "energy saving tips, energy gauge options, energy calculator", as well as a "back" selection. FIG. 17 depicts the user interface including energy savings tips and displays various ideas for optimizing energy performance. For example, the tips may read as follows: "position your refrigerator away from a heat source such as an oven, dishwasher or direct sunlight from a window; to allow air to circulate around the condenser coils, leave space between the wall or cabinets and the refrigerator or freezer and keep the coils clean; make sure the door seals are air tight; and keep your refrigerator and your freezer at 0 degrees Fahrenheit." Up and down arrows may be provided for scrolling to additional energy savings tips. FIG. 18 depicts the user interface including energy gauge options, e.g. vacation mode where the unit's cooling cycles are cut back since no door openings are anticipated. There is also an off-peak hours cycle that cools down the unit to a minimum during peak hours, while deep cooling happens during off-peak hours. It is also possible to enter off-peak and peak hours and associated costs to allow the unit to know when the cycles start. For instance, at 9 pm, the off-peak hours start and the cost of energy at that time is $0.06 and at 6 am, the peak hours start and the cost of energy at that time is $0.10. Yet another user interface selection is shown at FIG. 19 which depicts an energy calculator. In this mode, it is possible to indicate how much sayings can be obtained by changing elements like temperature door opening or electricity costs. Showing calculations over long periods of time (i.e. yearly) is important to illustrate more substantial savings. As an example, if the current settings are changed to a freezer temperature is 6° F, the refrigerator temperature is 34° F, the average door openings per week is 92 and the unit electricity cost is $0.06 the user interface displays data related to the current setting as compared to the changed settings. For instance, the current settings might result in 4412 kWH per year used resulting in 23 tons of $CO_2$ emissions and $184.05 cost per year, while the changed settings would result in 3074 kWH per year used resulting in 17 tons of $CO_2$ emissions and $145.34 cost per year. FIG. 20 provides a list of actions that could be performed at times when the electric rates are off peak including delay defrost until off peak, prechill when nearing peak demand to keep the compressor usage at a minimum during peak demand and alert the user when peak demand is on which occurs when the doors are opened (light electric draw), when the ice dispenser is used or when the ice crusher is used, etc.

One path that is being pursued from the appliance perspective is to allow the onboard CPU (microprocessor) of the appliance to determine how to respond to an incoming signal asking for a load shedding response. For example, the CPU will turn on, turn off, throttle, delay, adjust, or modify specific functions and features in the appliance to provide a turndown in power consumption (FIG. 20). FIG. 21 defines specifically exemplary modes of what are possible. The main feature here is the enabling of the main board microprocessor or CPU to execute actions in the appliance to deliver load shedding (lowering power consumption at that instant). The actions available in each appliance are only limited to the devices that the CPU has control over, which are nearly all of the electrical consuming devices in an appliance. This may work better where the appliance has an electronic control versus an electromechanical control. FIG. 21 sets out exemplary appliance actions and responses to electric utility signals provided in conjunction with the Demand Side Management (DSM) system. This is part of the AMI initiative which provides remote metering functions such as remote meter reading, demand signaling/load control, etc. Examples of actions/responses upon receiving a high price energy signal, the user may set the unit to: a) delay all special modes until the low priced energy signal is received including mode examples of ice marker, beverage center, turbo cool, custom cool and quick ice; b) override the high priced energy signal, always or based on a certain #kWH level; c) delay defrost until performance is/would be affected: d) announce or audible alert of the "high priced energy signal" during a cycle; e) visually alert the user of the "high priced energy" signal; f) display the cost of running the unit in the selected mode of operation; g) display the cost of energy at the present time; h) disable lighting and i) turn off sweat heaters.

Of course, the above description focuses on the refrigerator but these concepts are equally applicable to other home appliances such as dishwashers, water heaters, washing machines, clothes dryers, televisions (activate a recording feature rather than turning on the television), etc., and the list is simply representative and not intended to be all encompassing.

Likewise, although these concepts have been described with respect to appliances, they may find application in areas other than appliances and other than electricity usage. For example, a controller that acts as an intermediary between the utilities meter and the appliance interprets the utility signal, processes it and then submits this signal to the appliance for the prescribed reaction. In a similar fashion, the controller may find application to other household utilities, for example, natural gas and water within the home. One can equip the water and gas meters to measure flow rates and then drive responses to a gas water heater or gas furnace precisely like the electrical case. This would assume that one might experience variable gas and water rates in the future. Secondly, the flow meters being connected to the controller could provide a consumer with a warning as to broken or leaking water lines by comparing the flow rate when a given appliance or appliances are on to the normal consumption. In cases where safety is a concern, the system could stop the flow of gas or water based on the data analysis.

Another feature might be the incorporation of "remote subscription" for the utility benefit. In some cases, the utility will be providing customers discounts/rebates for subscribing to DSM in their appliances, hot water heaters, etc. The "remote subscription" feature would allow the utility to send a signal that would "lockout" the consumer from disabling the feature since they were on the "rebate" program.

Another feature that the controller lends itself to is the inclusion of "Remote diagnostics". This feature would allow the appliance to send a signal or message to the controller indicating that something in the appliance was not up to specifications. The controller could then relay this signal to the utility or to the appliance manufacturer via the various communication avenues included into the controller (i.e., WIFI, WIMAX, Broadband, cell phone, or any other formats that the controller could "speak").

In the case of a remote subscription, the utilities today rely on the honesty of their subscribers to leave the DSM system functional. Some people may receive the discounts/rebate and then disable the feature that drives the load shedding. With this system, the utility can ensure that the feature will be enabled and provide the proper load shedding.

Figure 22:
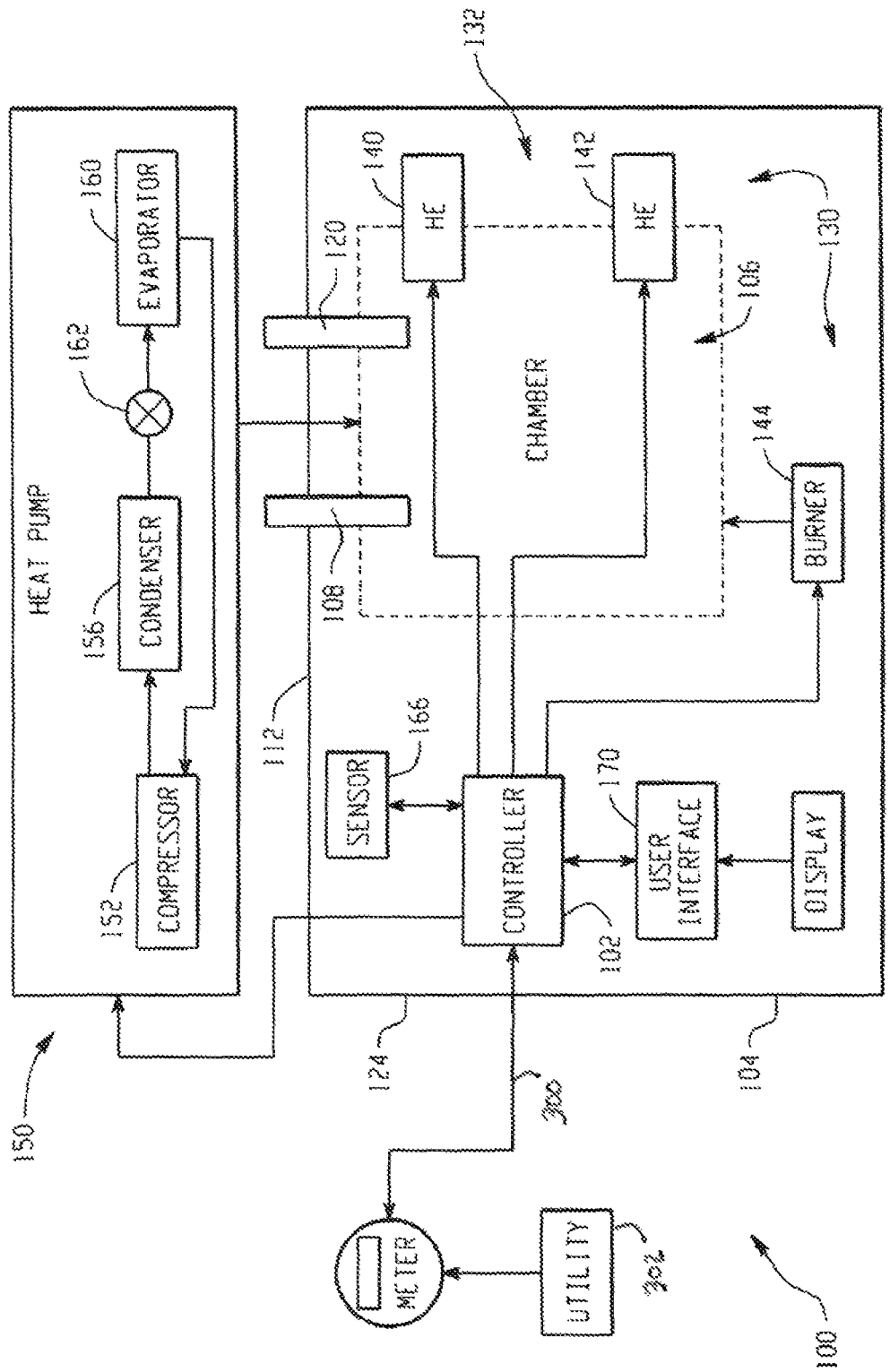
FIG. 22 is a schematic illustration of an exemplary demand managed water heater.

An exemplary embodiment of a demand managed water heater 100 is schematically illustrated in FIG. 22. The water heater 100 comprises one or more power consuming features/functions and a controller 102 operatively connected to each of the power consuming features/functions. The controller 102 can include a micro computer on a printed circuit board which is programmed to selectively control the energization of the power consuming features/functions. The controller 102 is configured to receive and process a signal 300 indicative of a utility state, for example, availability and/or current cost of supplied energy. The energy signal may be generated by a utility provider 302, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 102 can operate the water heater 100 one of a plurality of operating modes, including a normal operating mode and an energy savings mode, in response to the received signal. Specifically, the water heater 100 can be operated in the normal mode in response to a signal indicating an off-peak demand state or period and can be operated in an energy savings mode in response to a signal indicating a peak demand state or period. As will be discussed in greater detail below, the controller 102 is configured to at least one of selectively delay, adjust and disable at least one of the one or more power consuming features/functions to reduce power consumption of the water heater 100 in the energy savings mode. It should be appreciated that the controller can be configured with default settings which govern normal mode and energy savings mode operation. Such settings in each mode can be fixed while others adjustable to user preference and to provide response to load shedding signals.

Generally, and according to one exemplary embodiment of the invention, the water heater 100 includes a tank or body 104 having a chamber or elongated hollow 106 for receiving water. An inlet pipe 108 extends through an upper portion, particularly a top wall 112, of the tank and into the chamber for admitting relatively cold water into a lower portion of the chamber. An outlet pipe 120 extends through the upper portion of the tank for permitting flow of relatively hot water from the chamber. The water tank 100 can be encased by a housing or wrapper 124. An inner surface of the housing and an outer surface of the water tank together define an insulation volume that serves to insulate the tank from the external environment. A heater 130 is operatively associated with the chamber for heating the water within to chamber to a user selected setpoint temperature.

According to one aspect, the heater 130 includes at least one electrically driven heating element 132 for heating the water in the chamber. The at least one heating element can include upper and lower electric resistance type heating elements 140, 142 which are mounted to the side of tank 104 and extend into the chamber. The upper and lower heating elements can be selectively energized to supply heat to the tank-stored water under the control of a thermostat or other temperature sensing device which monitors the temperature of the stored water. According to another aspect, the heater 130 include a gas burner 144 for heating the water in the chamber 106. According to yet another aspect, the heater 130 includes the heater includes the electrically driven heating element 132 and the burner 144 for heating the water within the chamber.

According to another aspect, the water heater 100 can be a heat pump water heater having a heat exchange system 150. The heat exchange system is a closed loop system defining passages for a refrigerant fluid to flow. Generally, refrigerant flows to a compressor 152 mounted on the body/tank 104. The compressor may be driven by electrical energy or other suitable power source. The compressor imparts pressure to the refrigerant fluid, thereby increasing its temperature, and discharges the refrigerant in a hot state. The hot refrigerant vapor passes into chamber 106. A condenser 156 can comprise one or more tubes adapted to receive the hot refrigerant from the compressor. In one exemplary embodiment, the tubes can be adjacent to, and supported by, the outer surface of the body 104. In this embodiment, the tubes can circumscribe the body 104 and impart heat to the water in the chamber. Alternatively, the tubes can be located within the chamber 106. An evaporator 160 is mounted on the body 104 generally adjacent the compressor 152 and is adapted to receive cooled refrigerant from a conduit extending from the condenser 156. A thermostatic expansion valve 162 can be located on the conduit to meter the flow of liquid refrigerant entering the evaporator 160 at a rate that matches the amount of refrigerant being boiled off in the evaporator. The evaporator is adapted to discharge refrigerant to a conduit which is in communication with the compressor 152. Fans are provided adjacent the evaporator for producing a current of air. Condensate from the evaporator is drained off.

Typically the heat exchange system 150 replaces the function of the lower heating element. It should be appreciated that according to one aspect, the heat exchange system can be used with both the upper and lower electric heat elements. It should also be appreciated that the heat exchange system can be used with the gas burner. A thermistor or sensor 166 is located on the tank 104. The sensor is operative to sense the temperature of the tank wall which corresponds to water temperature in the chamber 106. The output of the sensor is processed by the controller 102. The controller, in response to the sensor output, selectively actuates at least one of the upper heat element, lower heat element and the compressor and evaporator to heat the water in the chamber 106.

A control panel or user interface 170 is provided on the water heater 100 and is operatively connected to the controller 102. The control panel 170 can include a display and control buttons for making various operational selections, such as setting the setpoint temperature of the water heater.

If the controller 102 receives and processes an energy signal indicative of a peak demand period at any time during operation of the water heater 100, the controller makes a determination of whether one or more of the power consuming features/functions should be operated in the energy savings mode and if so, it signals the appropriate features/functions of the water heater 100 to begin operating in the energy savings mode in order to reduce the instantaneous amount of energy being consumed by the water heater. The controller 102 determines what features/functions should be operated at a lower consumption level and what that lower consumption level should be, rather than an uncontrolled immediate termination of the operation of specific features/functions.

In order to reduce the peak energy consumed by the water heater 100, the controller 102 is configured to at least one of selectively delay, adjust and disable at least one of the one or more above described power consuming features/functions to reduce power consumption of the water heater 100 in the energy savings mode. Reducing total energy consumed also encompasses reducing the energy consumed at peak times and/or reducing the overall electricity demands. Electricity demands can be defined as average watts over a short period of time, typically 5-60 minutes. Off peak demand periods correspond to periods during which lower cost energy is being supplied by the utility relative to peak demand periods. Operational adjustments that result in functional energy savings will be described in detail hereinafter.

As set forth above, the water heater 100 has a setpoint temperature in the normal operating mode. According to one aspect, to reduce the power consumption of the water heater 100 in the energy savings mode, the controller 102 is configured to reduce the setpoint temperature of the water heater to precipitate less heater on time in the energy savings mode. To further reduce the power consumption of the water heater, the controller 102 is configured to reduce power of at least one of the upper and lower heating elements 140, 142 in the energy savings mode. Particularly, the controller can reduce the setpoint temperature of the heating element in the energy savings mode. The controller can also deactivate, reduce voltage to and duty cycle one of the upper and lower heating elements in the energy savings mode. Regarding the water heater having both the electrically driven heating element 132 and the burner 144 for heating the water within the chamber, the controller is configured to deactivate one of the heating element and the burner in the energy savings mode. In this instance, the controller can determine the lowest cost option to utilize for the purpose of heating water, based on a user selected energy rate and/or the incoming energy signal.

According to another aspect, other power load reducing measures in a water heater may include increasing before on-peak hours the setpoint temperature (preheat) and slightly decreasing the setpoint temperature during on-peak rates. While still operating in the normal mode, the water within the chamber 106 can be preheated to a temperature higher than the original setpoint temperature (within limits for safety concerns) prior to operating in the energy savings mode to precipitate less heater on time in the energy savings mode. Some communication line with the utility could be established so that the utility can send a signal in advance to preheat the water and, in turn, decrease the temperature setting during on-peak rates. A mixing system can be provided to mix the preheated hot water with cold water during current demand in the normal mode to prevent scalding.

Regarding the heat pump water heater, the controller 102 is configured to deactivate at least one of the upper and lower heating elements 140, 142 in the energy savings mode unless performance degradation of the water heater is detected. Reducing the setpoint temperature of the heat pump water heater can precipitate less compressor on time in the energy savings mode. In one exemplary embodiment, the compressor 152 can be deactivated in the energy saving mode. In another exemplary embodiment, a duty cycle of the compressor 152 can be adjusted (for example, by time or by setpoint) in the energy savings mode. For example, the compressor can turn off until the reduced setpoint temperature is reached and then turn one with the same duty cycle or a different duty cycle. According to another aspect, to reduce the current draw of the compressor 152 in the energy savings mode, the heat capacity of the compressor can be adjusted, for example, by reducing speed of the compressor and/or capacity of the compressor (for example, a variable displacement/stroke compressor).

The determination of which power consuming features/functions are operated in a energy savings mode may depend on whether the water heater 100 is currently operating. In one embodiment, the controller 102 may include functionality to determine whether activation of the energy savings mode for any power consuming features/functions would potentially cause damage to any feature/function of the water heater 100 itself or would cause the water heater to fail to perform its intended function. If the controller 102 determines that an unacceptable consequence may occur by performing an energy saving action, such as deactivating or curtailing the operation of a power consuming feature/function in the water heater 100, the controller may opt-out of performing that specific energy saving action or may institute or extend other procedures. For example, according to one aspect, the controller 102 may determine that deactivation or limitation of the operation of the heating element may prevent the water within the chamber 106 from timely achieving the setpoint temperature due to current demand for hot water. Accordingly, the controller will not deactivate or limit the operation of the heating element in the energy savings mode. According to another aspect, in the energy savings mode if the sensed temperature of the water in the chamber 106 falls below the reduced setpoint temperature of the water heater 100, the controller 102 is configured to one of adjust the duty cycle of the compressor 152 to precipitate more compressor on time, increase the speed of the compressor 152 and increase the capacity of the compressor 152 until the measured temperature of the water is equal to the reduced setpoint temperature.

According to another aspect, occupancy sensors can be provided on the water heater. The occupancy sensors are in communication with the controller 102 so that the controller can automatically adjust operation of the water heater based on activity as detected by the sensors. For example, the sensors can have preprogrammed algorithms to detect presence of the homeowner. If the sensors do no detect the homeowner, the controller can operate in the energy savings mode regardless of the energy state. According to yet another aspect, advanced control techniques can be employed for hot water heating that monitor water outlet temperature in conjunction with ambient and/or flow to better control hot water temperature (without changing or adjusting the control algorithm). This would control heater percent run time to reduce overall energy usage. A thermal break can be provided in the discharge line to monitor pre and post temperatures to ascertain flow and control parameters.

Figure 23:
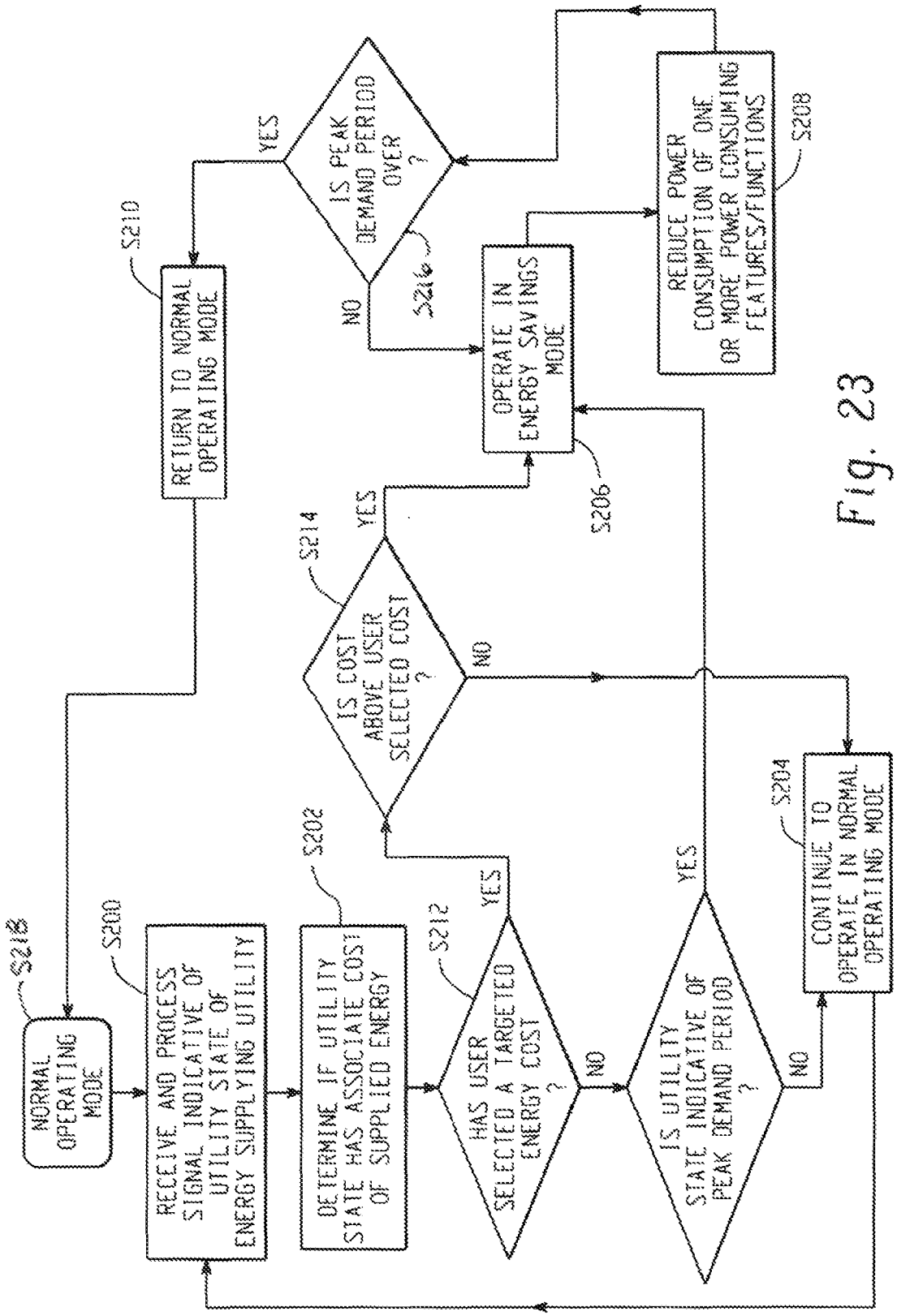
FIG. 23 is an exemplary operational flow charts for the water heater of FIG. 22.

With reference to FIG. 23, a water heater control method in accordance with the present disclosure comprises receiving and processing the signal indicative of cost of supplied energy (S200), determining a state for an associated energy supplying utility, such as a cost of supplying energy from the associated utility (S202), the utility state being indicative of a peak demand period or an off-peak demand period, operating the water heater 100 in a normal mode (S218) during the off-peak demand period (S204), operating the water heater in an energy savings during the peak demand period (S206), selectively adjusting and/or deactivating any number of one or more power consuming features/functions of the water heater 100 to reduce power consumption of the water heater in the energy savings mode, including reducing a setpoint temperature of the water heater to precipitate less heater on time in the energy savings mode (S208), determining if the peak demand period is over (S216) and returning to the normal mode after the peak demand period is over (S210). The control method further comprises reducing power of at least one of the upper and lower heating element 140, 142 in the energy savings mode by one of reducing the setpoint temperature, deactivating, reducing voltage to and duty cycling the at least one heating element in the energy savings mode. The control method further comprises selectively adjusting and/or activating any number of the one or more power consuming features/functions of the water heater to increase power consumption of the water heater in the normal mode prior to entering the energy savings mode, including increasing the setpoint temperature in the normal mode to precipitate more heater on time to preheat the water in the chamber to a temperature higher than the setpoint temperature.

As indicated previously, the control panel or user interface 170 can include a display and control buttons for making various operational selections. The display can be configured to communicate active, real-time feedback to the user on the cost of operating the water heater 100. The costs associated with using the water heater 100 are generally based on the current operating and usage patterns and energy consumption costs, such as the cost per kilowatt hour charged by the corresponding utility. The controller 102 is configured to gather information and data related to current usage patterns and as well as current power costs. This information can be used to determine current energy usage and cost associated with using the water heater 100 in one of the energy savings mode and normal mode. This real-time information (i.e., current usage patterns, current power cost and current energy usage/cost) can be presented to the user via the display. Information and data related to usage patterns (e.g., unusual usage patterns or continuous usage patterns) could also identify a water leak or gas leak. Solenoid valves could be provided to allow for automatic shut-off of the water or gas in the case of a leak.

It is to be appreciated that a manual or selectable override can be provided on the user interface 170 providing a user the ability to select which of the one or more power consuming features/functions are delayed, adjusted and/or disabled by the controller in the energy savings mode. The user can override any adjustments, whether time related or function related, to any of the power consuming functions. Further, the user can override the current operating mode of the water heater 100. Particularly, as shown in FIG. 23, if the utility state has an associated energy cost, the user can base operation of the water heater on a user selected targeted energy cost, such as a selected pricing tier or cost per kilowatt hour charged by the corresponding utility (S212). If the current cost exceeds the selected cost, the controller 102 will operate the water heater 100 in the energy savings mode (S214). If the current cost is less than the selected cost, the controller 102 will operate the water heater 100 in the normal mode (S214). This operation based on a user selected targeted energy cost is regardless of the current energy cost being indicative of one of a peak demand period and an off-peak demand period.

The operational adjustments, particularly an energy savings operation can be accompanied by a display on the control panel which communicates activation of the energy savings mode. The energy savings mode display can include a display of "ECO", "Eco", "EP","ER", "CP", "CPP", "DR", or "PP" on the appliance display panel in cases where the display is limited to three characters. In cases with displays having additional characters available, messaging can be enhanced accordingly. Additionally, an audible signal can be provided to alert the user of the water heater operating in the energy savings mode.

The duration of time that the water heater 100 operates in the energy savings mode may be determined by information in the energy signal. For example, the energy signal may inform the controller 102 to operate in the energy savings mode for a few minutes or one hour, at which time the water heater 100 returns to normal operation. Alternatively, the energy signal may be continuously transmitted by the utility provider, or other signal generating system, as long as it is determined that instantaneous load reduction is necessary. Once transmission of the signal has ceased, the water heater 100 returns to normal operating mode. In yet another embodiment, an energy signal may be transmitted to the controller 102 to signal the water heater 100 to operate in the energy savings mode. A normal operation signal may then be later transmitted to the water heater to signal the water heater to return to the normal operating mode.

The operation of the water heater 100 may vary as a function of a characteristic of the utility state and/or supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. The controller 102 is configured to operate the water heater in an operating mode corresponding to one of the price tiers. For example, the controller is configured to operate the water heater 100 in the normal operating mode during each of the low and medium price tier and is configured to operate the water heater in the energy savings mode during each of the high and critical price tier. However, it will be appreciated that the controller could be configured to implement a unique operating mode for each tier which provides a desired balance between compromised performance and cost savings/energy savings. If the utility offers more than two rate/cost conditions, different combinations of energy saving control steps may be programmed to provide satisfactory cost savings/performance tradeoff.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A water heater comprising:
a body defining a chamber for holding water to be heated;
an inlet opening and an outlet opening in communication with the chamber for flowing water therethrough;
one or more power consuming features/functions comprising a heater for heating the water within the chamber; and
a controller operatively connected to the one or more power consuming features/functions, the controller configured to receive and process a signal indicative of a current state of an associated utility, the controller operating the water heater in one of a plurality of operating modes, the plurality of operating modes comprising at least as normal operating mode and an energy savings mode, and in response to the received signal, the controller further configured to at least one of selectively adjust and deactivate at least one of the one or more power consuming features/functions to reduce power consumption of the water heater in the energy savings mode.

2. The water heater of claim 1, wherein the water heater comprises a setpoint temperature for the water within the chamber, the controller configured to adjust the setpoint temperature to precipitate less heater on time in the energy savings mode.

3. The water heater of claim 2, wherein the controller is configured to increase before a peak demand period the setpoint temperature to preheat the water in the chamber to a temperature higher than the setpoint temperature and decrease the setpoint temperature during the peak demand period.

4. The water heater of claim 1, wherein the heater comprises at least one electrically driven heating element coupled to the body for heating the water within the chamber, the controller configured to reduce power of the at least one heating element in the energy savings mode.

5. The water heater of claim 4. wherein the at least one heating element has a maximum setpoint temperature in the normal operating mode, the controller configured to reduce a setpoint temperature of the at least one heating element in the energy savings mode.

6. The water heater of claim 4, wherein the at least one heating element comprises an upper heating element and a lower heating element, the controller configured to one of deactivate, reduce voltage to and duty cycle one of the upper and lower heating elements in the energy savings mode.

7. The water heater of claim 6, wherein the controller is configured to deactivate the tower heating, element in the energy savings mode unless performance degradation of the water heater is detected.

8. The water heater of claim 4, wherein the heater further comprises a heat pump comprising a compressor for heating the water within the chamber, the controller configured to deactivate the at least one heating element in the energy savings mode.

9. The water heater of claim 8, wherein the water heater comprises a setpoint temperature for the water within the chamber, the controller configured to reduce the setpoint temperature to precipitate less compressor on time in the energy savings mode.

10. The water heater of claim 9, wherein the controller is configured to one of adjust a duty cycle of and adjust a heat capacity of the compressor in the energy savings mode.

11. The water heater of claim 1, wherein the heater comprises an electrically driven heating element coupled to the body and a burner for heating the water within the chamber, the controller configured to determine the lowest cost option for heating the water and deactivate one of the heating element and the burner in the energy savings mode based on one of a user selected targeted energy cost rate and the received signal.

12. The water heater of claim 1, wherein the current state of the associated utility has an associated energy cost and wherein the controller is configured to override a current operating mode of the water heater based on a user selected targeted energy cost,
wherein if current energy cost exceeds the user selected cost, the controller operates the water heater in the energy savings mode, and
wherein if the current energy cost is less than the user selected cost, the controller operates the water heater in the normal operating mode.

13. The water heater of claim 1, further comprising a user interface operatively connected to the controller, the user interface comprising a selectable override option providing a user an ability to select which of the one or more power consuming features/functions are adjusted and/or disabled by the controller in the energy savings mode, the user interface further comprising a display communicating activation of the energy savings mode.

14. The water heater of claim 1, wherein the current state of the associated utility has an associated energy cost and further comprising a display communicating current cost of energy and current cost of operating the water heater.

15. A water heater control method, comprising:
determining a current state for an associated energy supplying utility, the current state of the associated energy supplying utility being indicative of at least a peak demand period or an off-peak demand period;
operating the water heater in a normal mode during the off-peak demand period;
operating the water heater in an energy savings mode during the peak demand period;
selectively adjusting and/or deactivating any number of one or more power consuming features/functions of the water heater to reduce power consumption of the water heater in the energy savings mode in response to the current state of the associated energy supplying utility, and reducing a setpoint temperature of the water heater to precipitate less heater on time in the energy savings mode; and
returning to the normal mode after the peak demand period is over.

16. The method of claim 15, further comprising selectively adjusting and/or activating any number of the one or more power consuming features/functions of the water heater to increase power consumption of the water heater in the normal mode prior to entering the energy savings mode.

17. The method of claim 16, further comprising increasing the setpoint temperature in the normal mode to precipitate more heater on time to preheat the water in the chamber to a temperature higher than the setpoint temperature.

18. The method of claim 15, wherein the one or more power consuming features/functions comprises at least one electrically driven heating element for heating water within the water heater, and further comprising, reducing power of the at least one heating element in the energy savings mode.

19. The method of claim 18, further comprising reducing a setpoint temperature of the at least one electrically driven heating element in the energy savings mode.

20. The method of claim 18, wherein the one or more power consuming features/functions further comprises a heat pump having a compressor for heating water within the water heater, and further comprising one of deactivating, reducing voltage to and duty cycling the at least heating element in the energy savings mode.

21. The method of claim 20, further comprising one of adjusting a duty cycle of, reducing a speed of and reducing a capacity of the compressor in the energy savings mode.

22. The method of claim 15, further comprising:
determining energy cost associated with the current state of the associated energy supplying utility;
displaying current cost of operating the water heater,
displaying current cost of supplied energy, and
alerting a user of a peak demand period.

23. A water heater comprising:
a body defining a chamber for holding water to be heated;
an inlet opening and an outlet opening in communication with the chamber for flowing water therethrough;
a first heater and a second heater for heating the water in the chamber, the first heater comprising one of an electrically driven heating element and a burner, the second heater comprising a heat pump; and
a controller configured to receive and process an energy signal indicative of a current state of an associated utility, the energy signal having a first state indicative of a utility peak demand period and a second state indicative of a utility off-peak demand period, the controller operating the water heater in one of an energy savings mode and a normal operating mode based on the energy signal received and being in the first and second states respectively,
wherein the controller is configured to increase a setpoint temperature of the water heater and deactivate the first heater in the energy savings mode unless performance degradation of the water heater is detected.

24. The water heater of claim 23, wherein the energy signal has an associated energy cost and wherein the controller is configured to override the operating mode of the water heater based on a user selected targeted energy cost.

25. The water heater of claim 23, wherein the controller is configured to increase the setpoint temperature before the utility peak demand period to preheat the water in the chamber to a temperature higher than the setpoint temperature and decrease the setpoint temperature during the utility peak demand period.

* * * * *

UNITED STATES PATENT AND TRADEMARK OFFICE
CERTIFICATE OF CORRECTION

PATENT NO. : 8,367,984 B2
APPLICATION NO. : 12/559654
DATED : February 5, 2013
INVENTOR(S) : Besore et al.

It is certified that error appears in the above-identified patent and that said Letters Patent is hereby corrected as shown below:

In the Specification

In Column 2, Line 3, delete "Heating" and insert -- Heating, --, therefor.

In Column 2, Line 6, delete "he" and insert -- be --, therefor.

In Column 2, Line 33, delete "least," and insert -- least --, therefor.

In Column 6, Line 40, delete "server," and insert -- server. --, therefor.

In Column 6, Line 59, delete "readings," and insert -- readings. --, therefor.

In Column 6, Line 61, delete "occur," and insert -- occur. --, therefor.

In Column 8, Line 5, delete "a (2-way" and insert -- (a 2-way --, therefor.

In Column 8, Line 7, delete "seen" and insert -- seen in --, therefor.

In Column 8, Line 19, delete "8." and insert -- 8, --, therefor.

In Column 10, Line 4, delete "FIG. 11" and insert -- FIG. 11, --, therefor.

In Column 10, Line 34, delete "FIGS." and insert -- FIG. --, therefor.

In Column 10, Line 39, delete "used" and insert -- used, --, therefor.

In Column 10, Line 40, delete "e.g.," and insert -- e.g. --, therefor.

In Column 10, Line 50, delete "instance" and insert -- instance, --, therefor.

In Column 10, Line 56, delete "and." and insert -- and --, therefor.

In Column 10, Line 63, delete "mode" and insert -- mode, --, therefor.

Signed and Sealed this
Twenty-sixth Day of November, 2013

Margaret A. Focarino
*Commissioner for Patents of the United States Patent and Trademark Office*

CERTIFICATE OF CORRECTION (continued)

In Column 10, Line 64, delete "appear" and insert -- appear: --, therefor.

In Column 11, Line 2, delete "an," and insert -- an --, therefor.

In Column 11, Line 28, delete "$0.06" and insert -- $0.06/kWH, --, therefor.

In Column 12, Line 2, delete "#kWH" and insert -- #/kWH --, therefor.

In Column 12, Line 3, delete "affected:" and insert -- affected; --, therefor.

In the Claims

In Column 18, Line 40, in Claim 1, delete "as" and insert -- a --, therefor.

In Column 18, Line 63, in Claim 5, delete "4." and insert -- 4, --, therefor.

In Column 19, Line 7, in Claim 7, delete "tower heating," and insert -- lower heating --, therefor.